Figure 16:
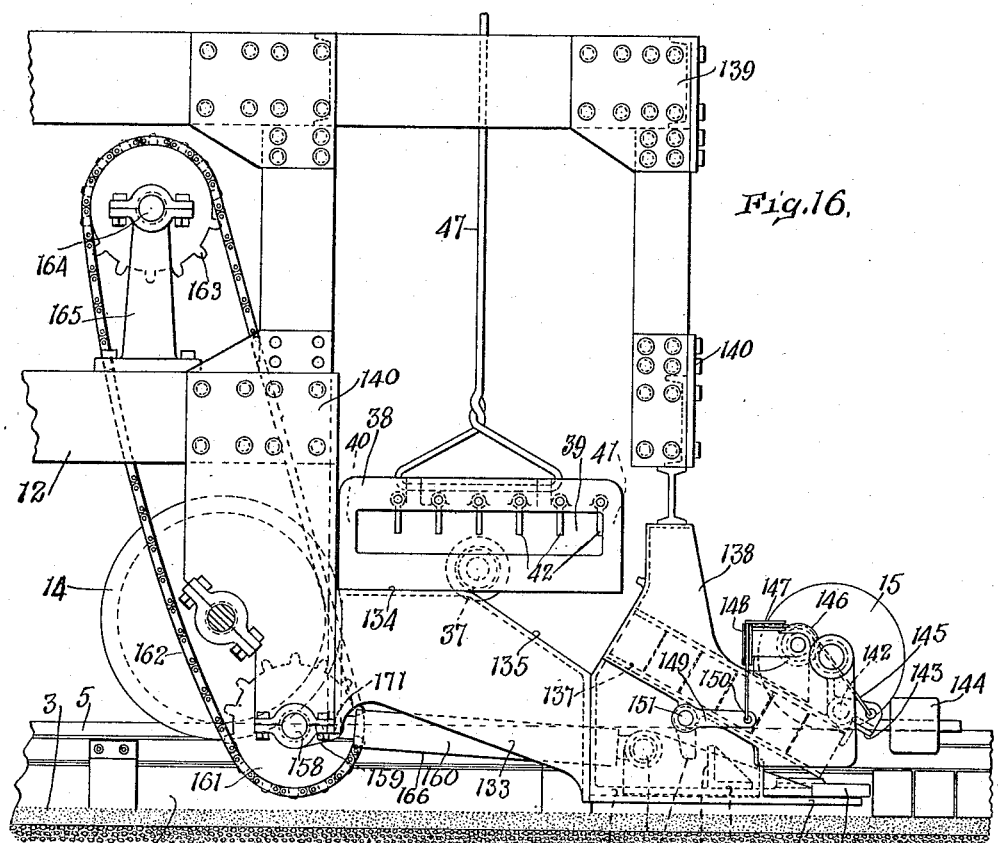

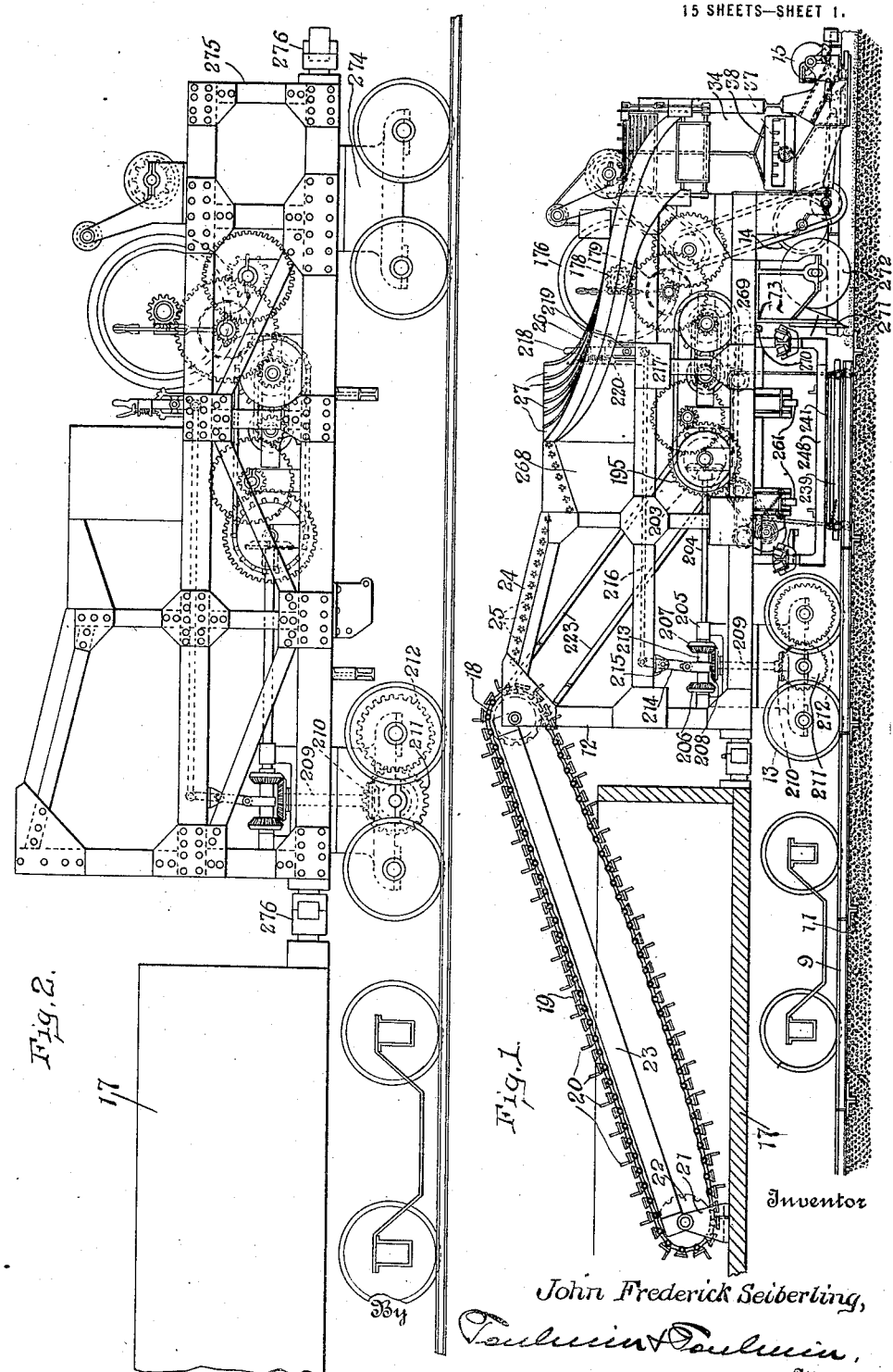

J. F. SEIBERLING.
PAVING MACHINE.
APPLICATION FILED JUNE 5, 1916.
1,276,817.
Patented Aug. 27, 1918.
15 SHEETS—SHEET 2.
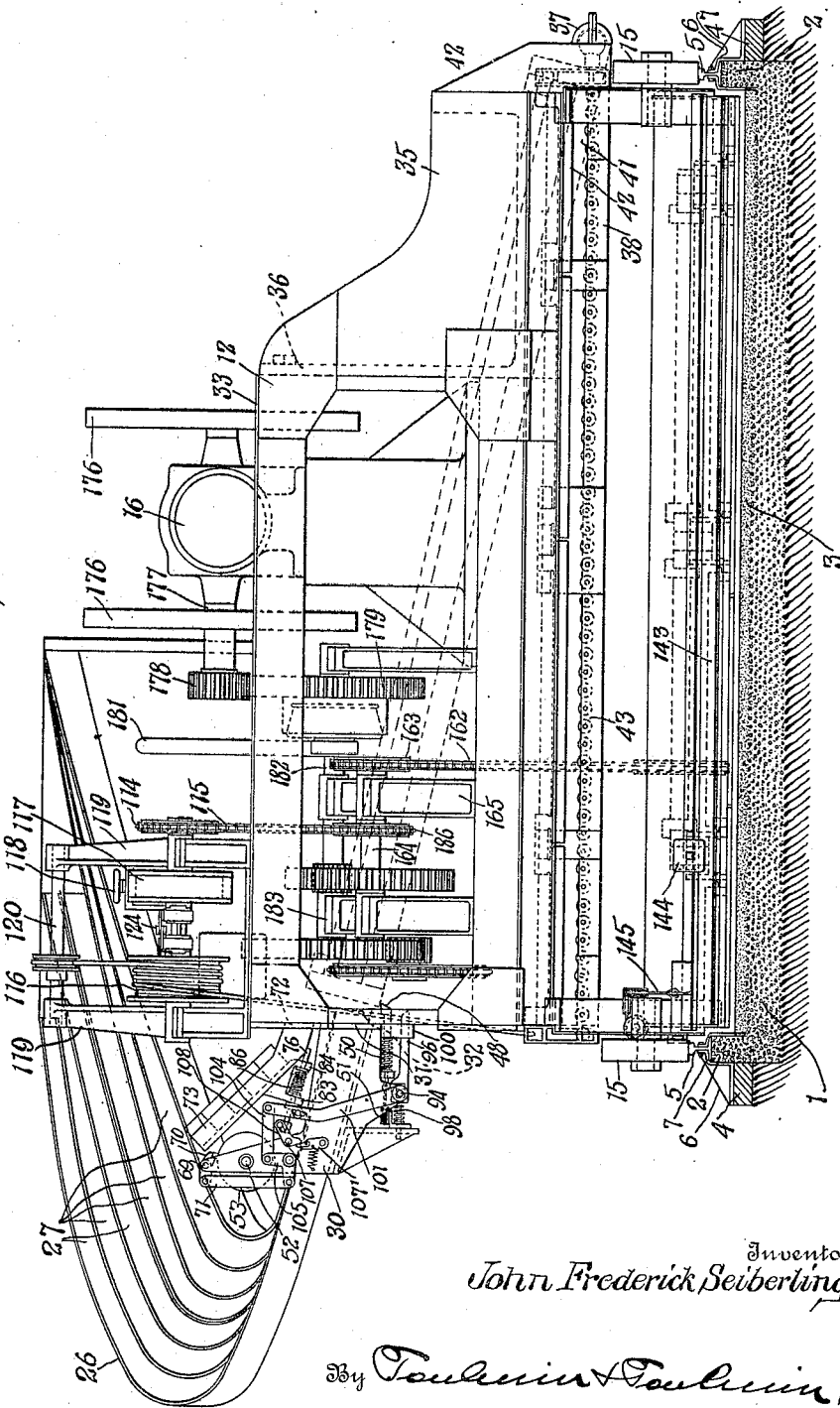
Inventor
John Frederick Seiberling,
By Toulmin & Toulmin,
Attorneys

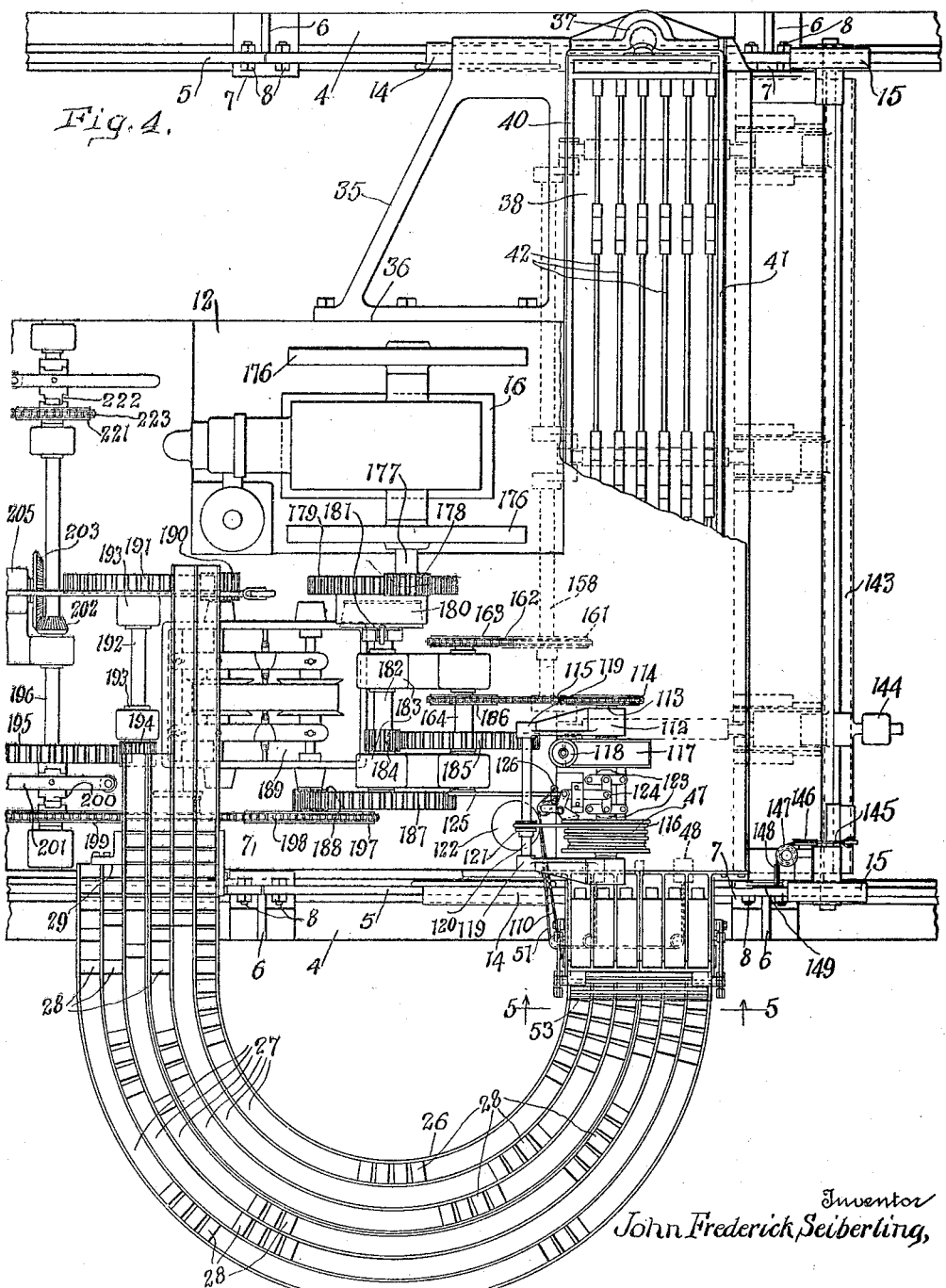

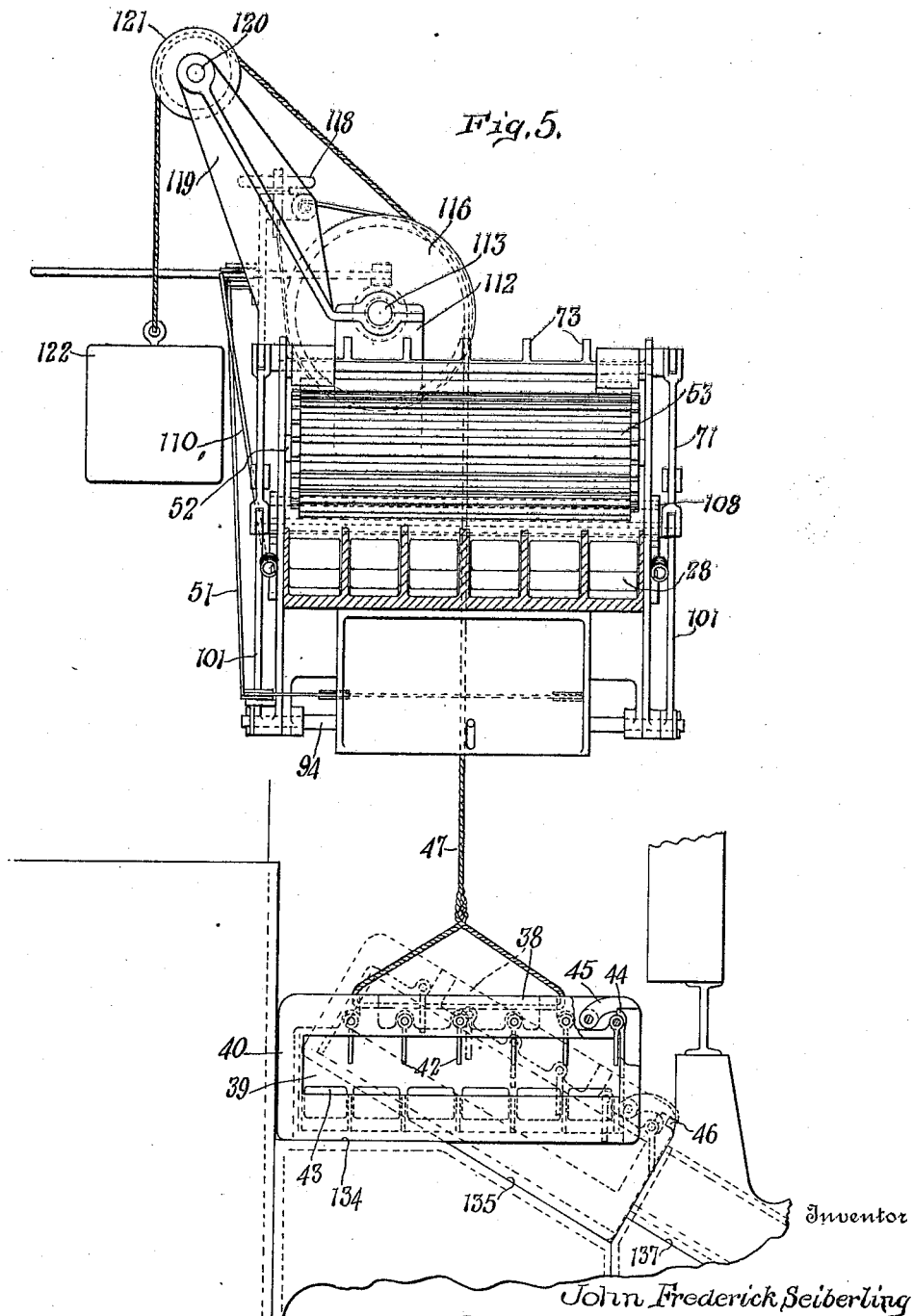

J. F. SEIBERLING.
PAVING MACHINE.
APPLICATION FILED JUNE 5, 1916.
1,276,817.
Patented Aug. 27, 1918.
15 SHEETS—SHEET 5.
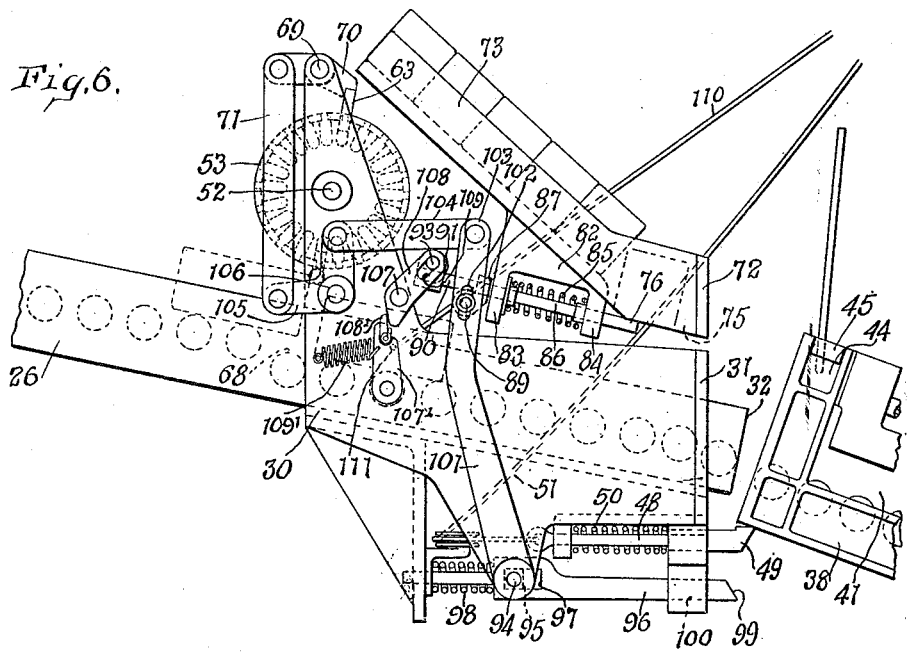
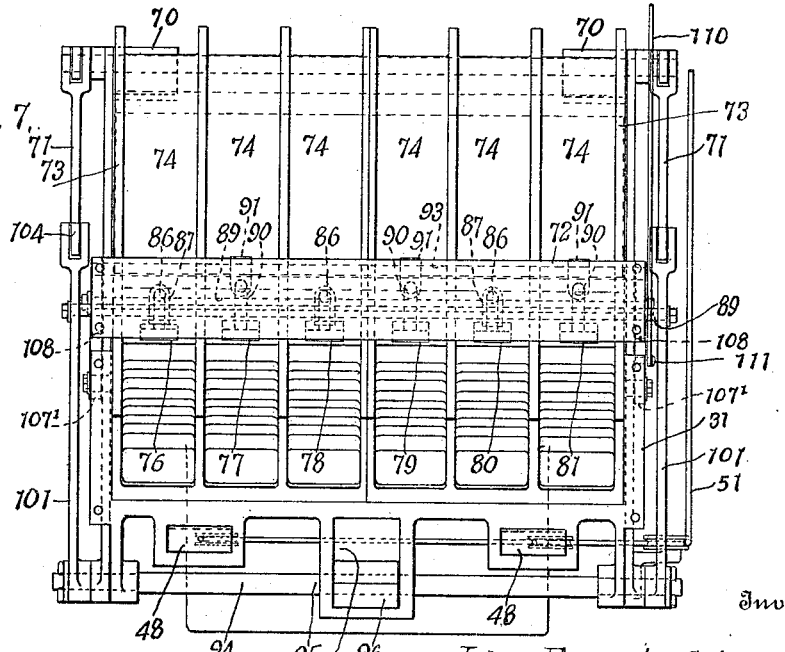
Inventor
John Frederick Seiberling,
By Toulmin & Toulmin,
Attorneys

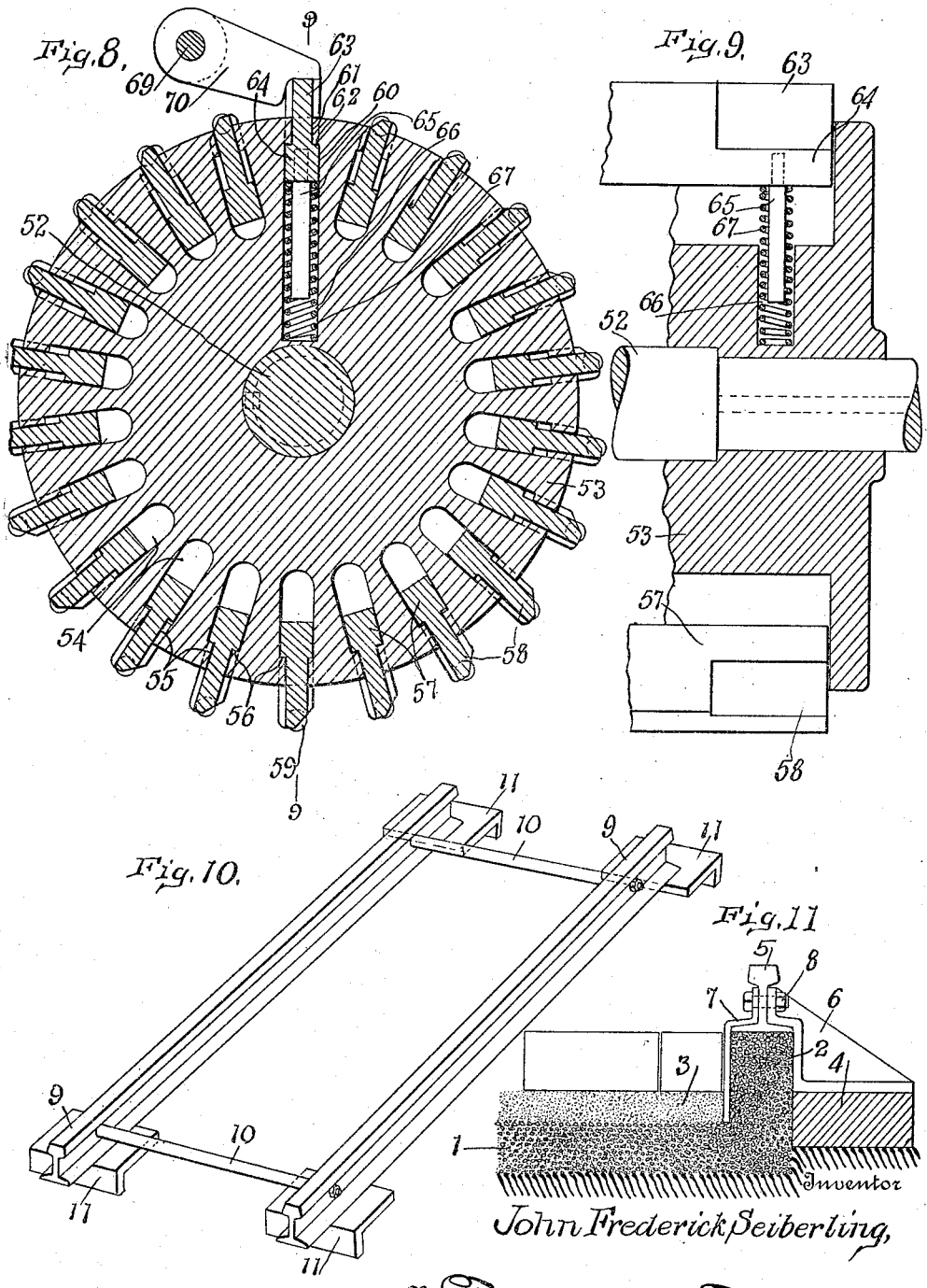

J. F. SEIBERLING.
PAVING MACHINE.
APPLICATION FILED JUNE 5, 1916.
1,276,817.
Patented Aug. 27, 1918.
15 SHEETS—SHEET 7.
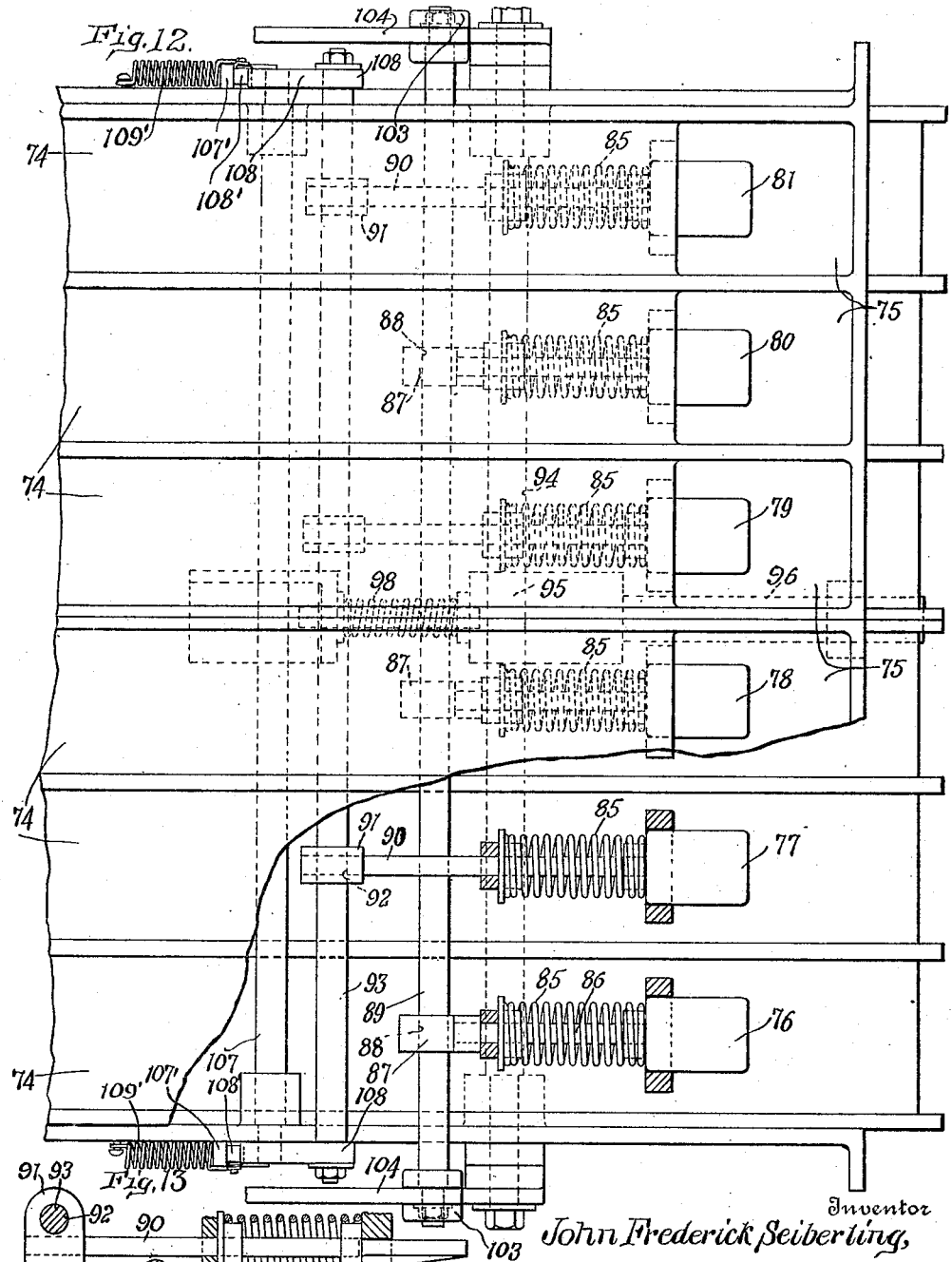
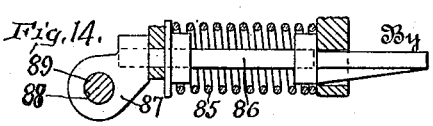
Inventor
John Frederick Seiberling,
By
Attorneys J. F. SEIBERLING.
PAVING MACHINE.
APPLICATION FILED JUNE 5, 1916.
1,276,817.
Patented Aug. 27, 1918.
15 SHEETS—SHEET 8.
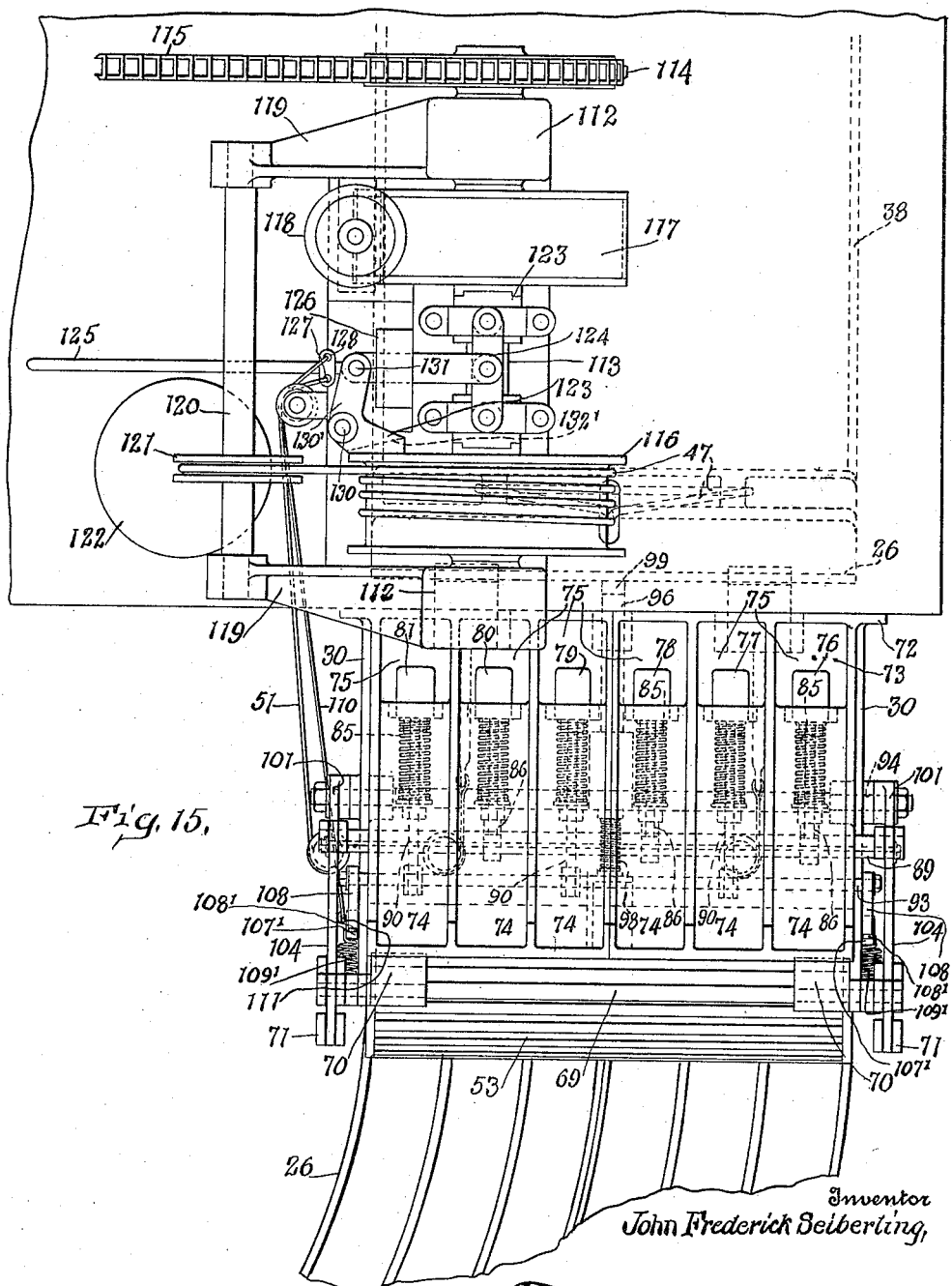
Fig. 15.
Inventor
John Frederick Seiberling,
By 
Attorneys

J. F. SEIBERLING.
PAVING MACHINE.
APPLICATION FILED JUNE 5, 1916.

1,276,817.

Patented Aug. 27, 1918.
15 SHEETS—SHEET 9.

Inventor
John Frederick Seiberling,
By
Toulmin & Toulmin, Attorneys

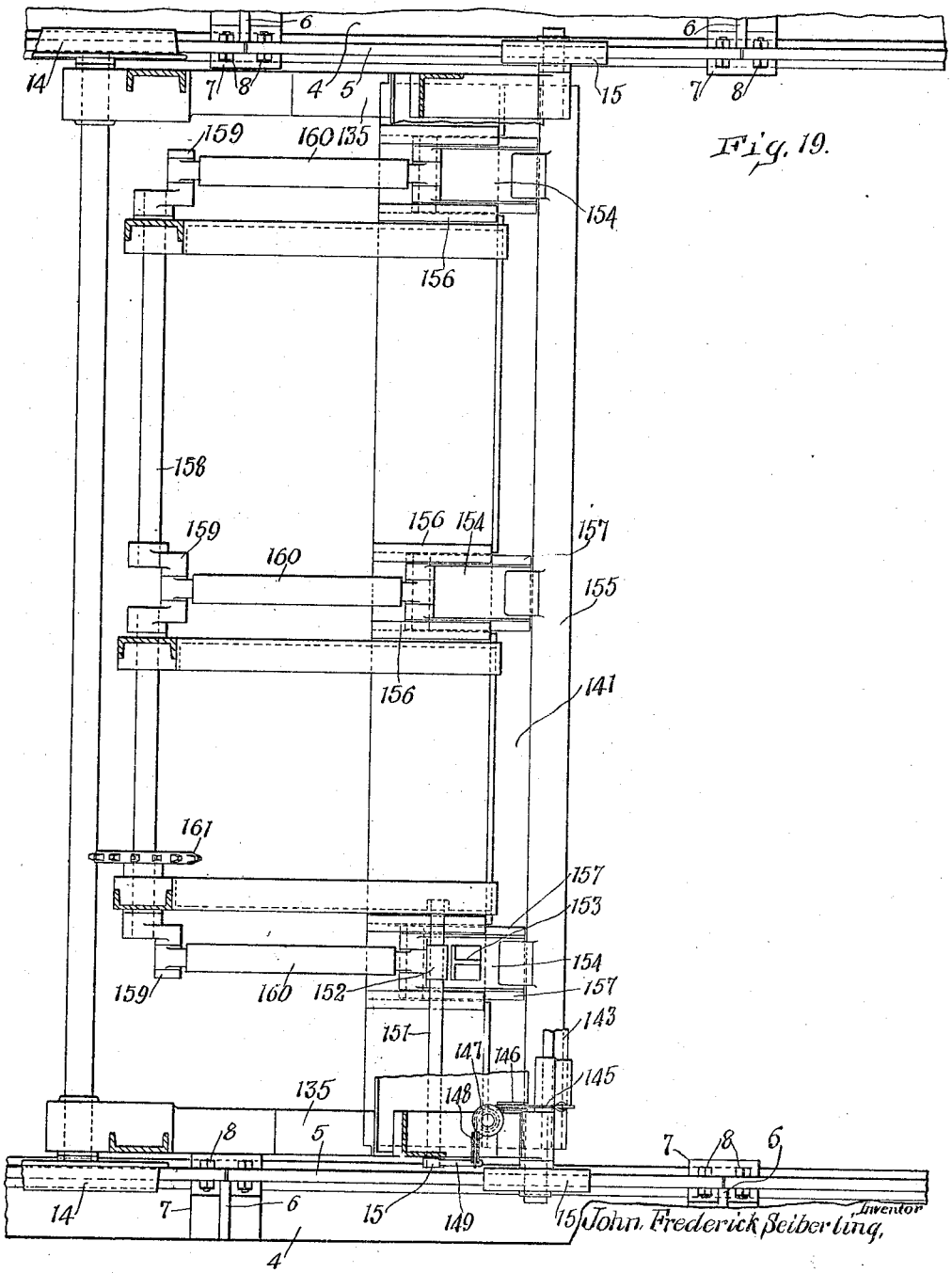

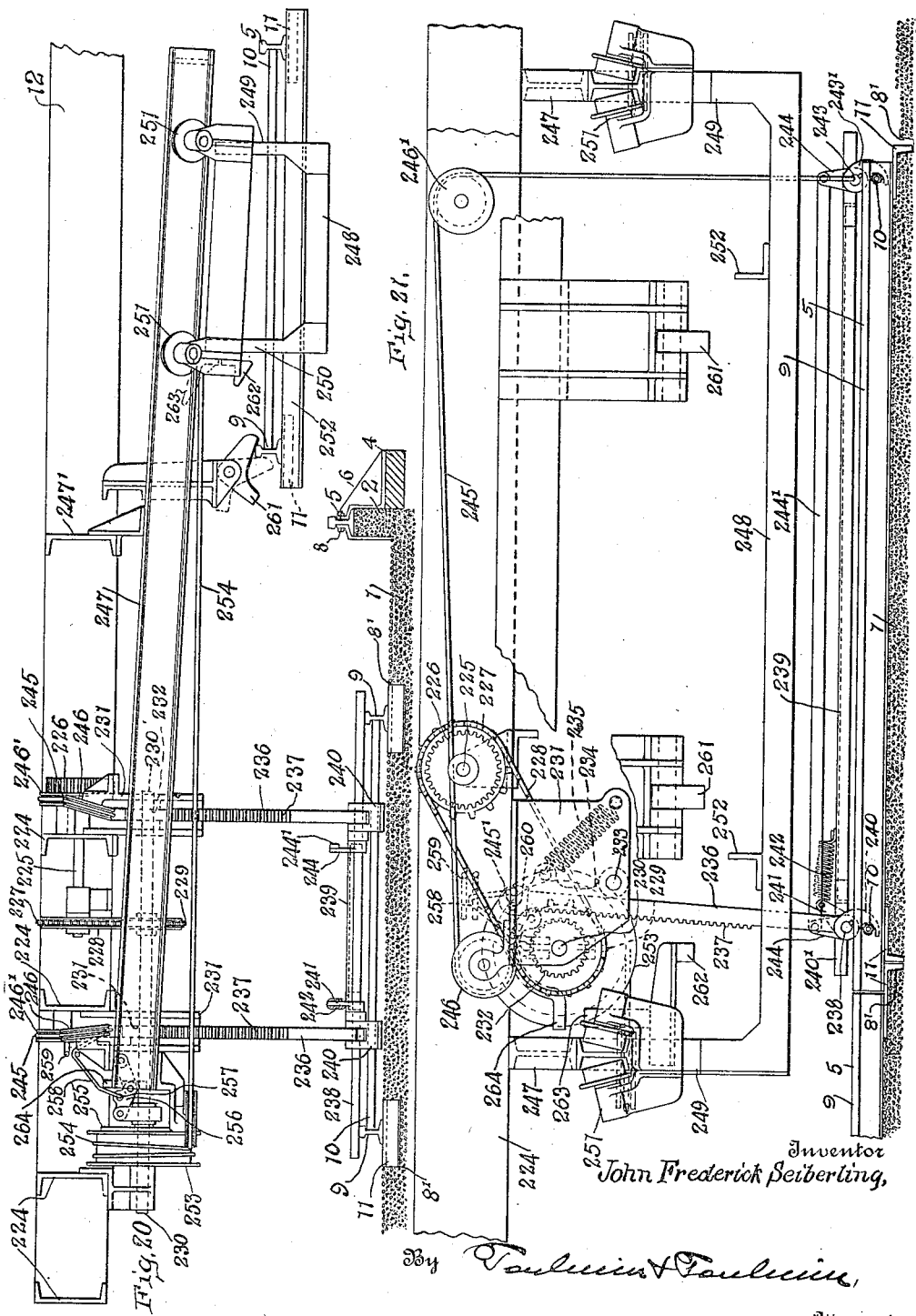

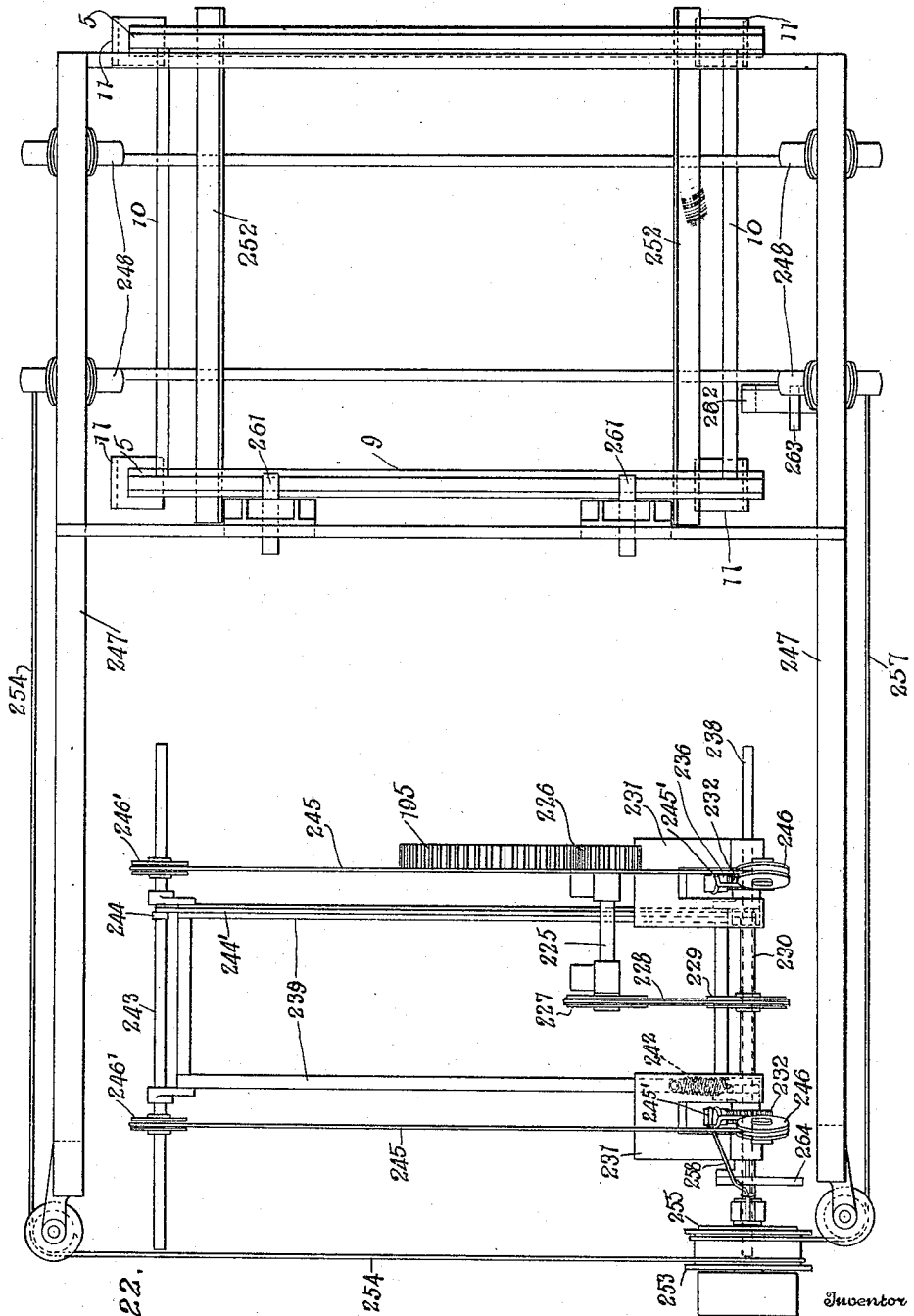

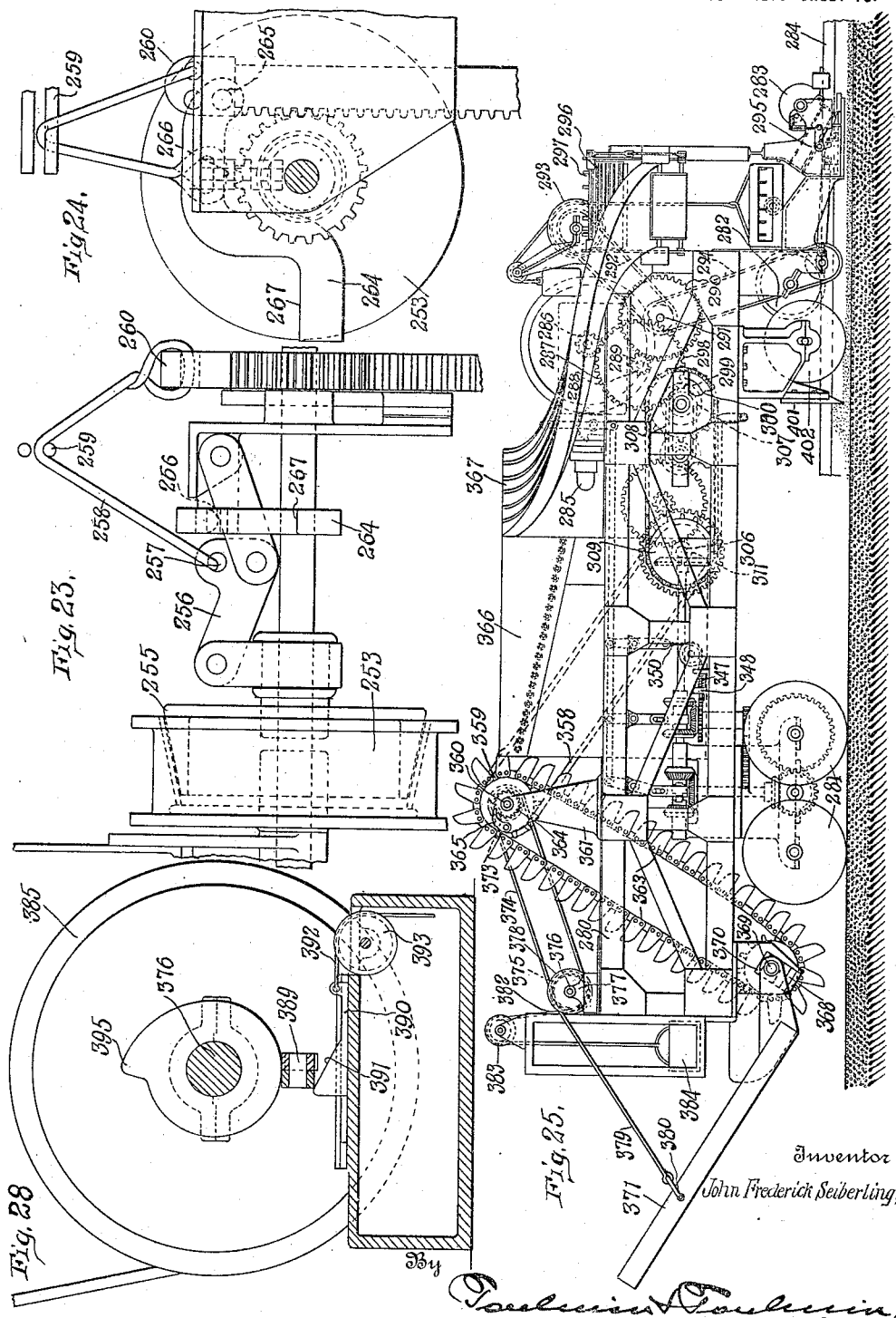

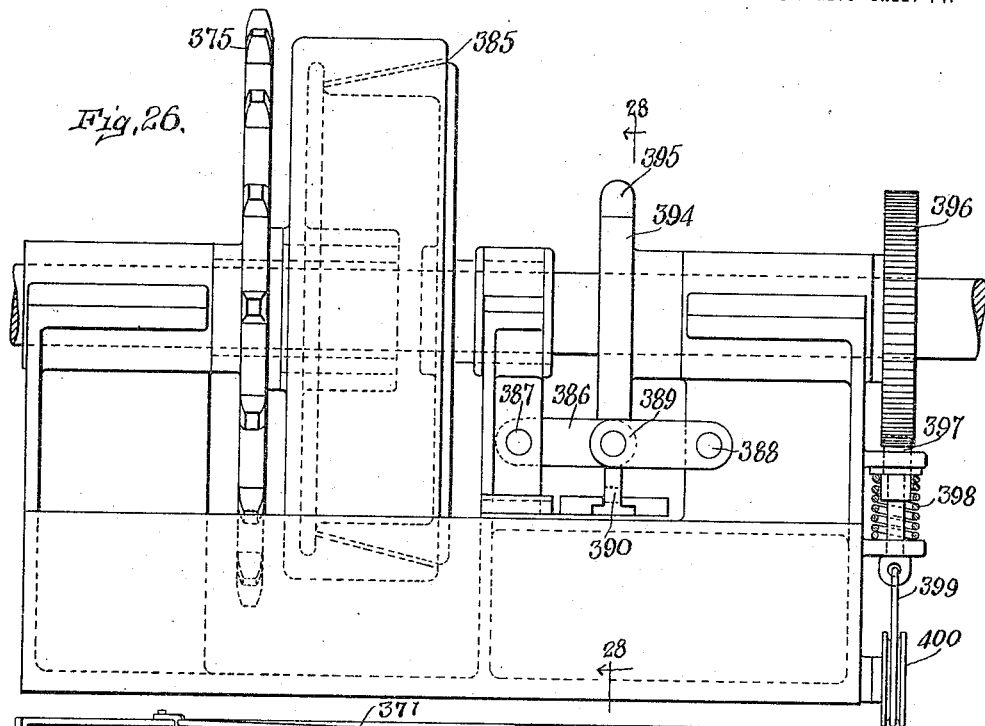
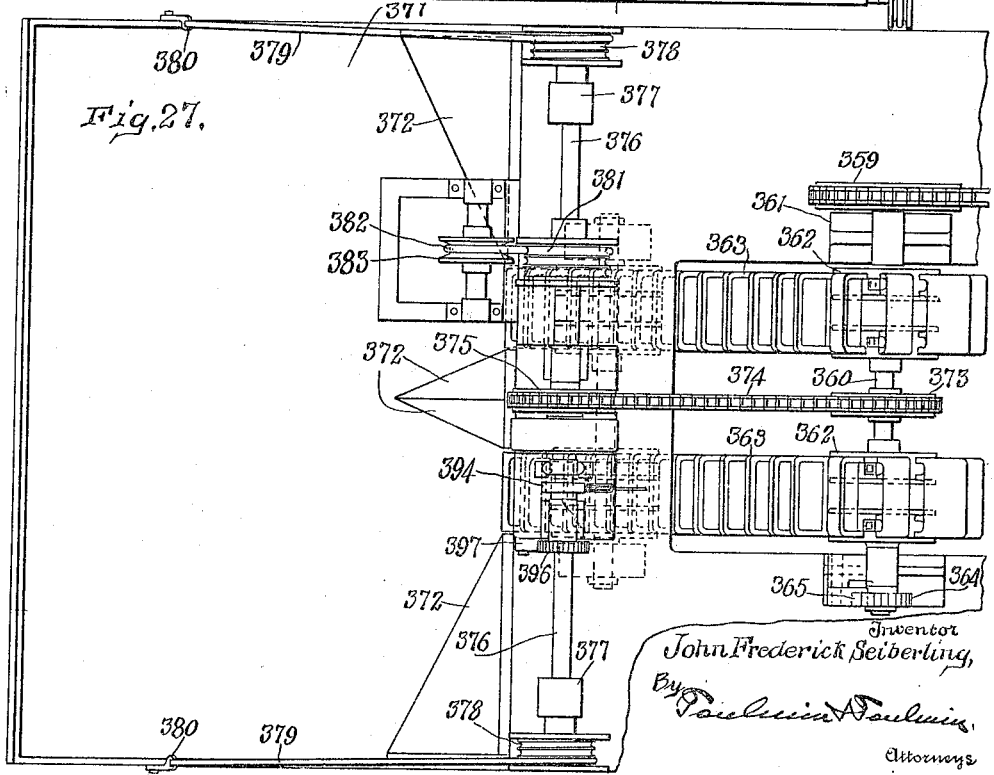

J. F. SEIBERLING.
PAVING MACHINE.
APPLICATION FILED JUNE 5, 1916.
1,276,817.
Patented Aug. 27, 1918.
15 SHEETS—SHEET 15.
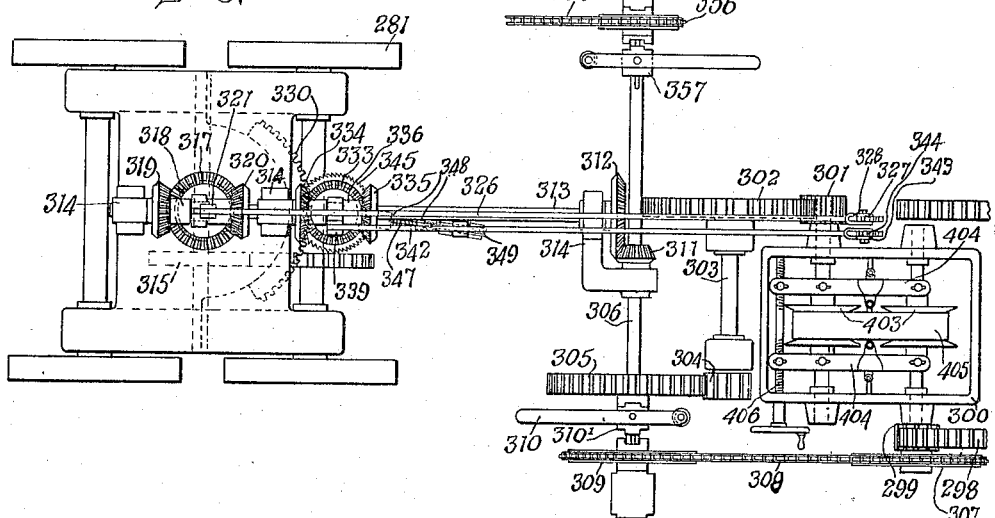
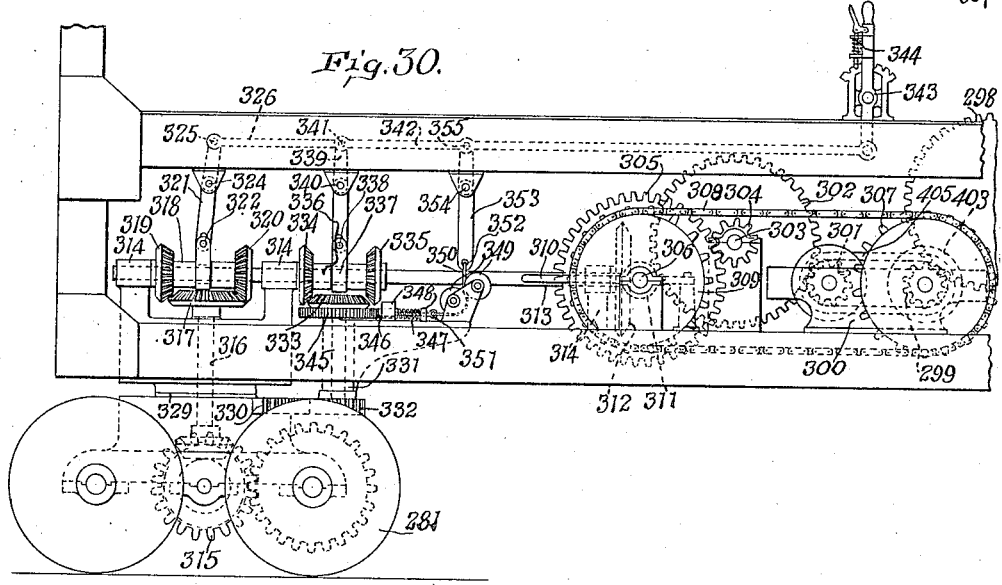
Inventor
John Frederick Seiberling,
By Toulmin & Toulmin,
Attorneys

UNITED STATES PATENT OFFICE.

JOHN FREDERICK SEIBERLING, OF AKRON, OHIO.

PAVING-MACHINE.

1,276,817.

Specification of Letters Patent. Patented Aug. 27, 1918.

Application filed June 5, 1916. Serial No. 101,743.

*To all whom it may concern:*

Be it known that I, JOHN FREDERICK SEIBERLING, a citizen of the United States, residing at Akron, in the county of Summit and State of Ohio, have invented certain new and useful Improvements in Paving-Machines, of which the following is a specification, reference being had therein to the accompanying drawing.

This invention relates to paving machines and to machines especially adapted for laying brick. In highway construction experience has demonstrated the merits and serviceability of pavements constructed of brick laid upon an adequate concrete base. Although these pavements are very serviceable, yet the original cost thereof is very high. The present cost of brick pavements is about equally divided between costs of material and labor. It is an object of this invention to reduce the first cost of paving due to labor to a great extent. My machine provides means whereby the time and labor necessary for handling the brick is reduced to a minimum. It also provides means for alining the bricks in proper relation to be laid, and it finally provides means for laying the bricks in position upon the road. The mechanism is so arranged that a minimum of attention is required, several parts of the same are automatic and the remaining parts can be quickly and easily operated.

Another object of the invention is to provide a machine having a self-contained source of power, this source of power operating independently the travel of the machine and the brick laying devices.

Another object of the invention is to provide mechanism for automatically determining the number of bricks in a row and also for breaking joints in order that the pavement may be as good as pavements now made by hand.

My invention contemplates a machine that will travel either directly upon the road or upon specially constructed tracks. In the machine which is adapted to travel upon a track I have provided an automatic track lifting device whereby as the machine travels along sections of track may be lifted and dropped to one side automatically.

In one embodiment of my invention the machine is adapted, as was stated above, to travel on specially constructed tracks. The concrete base used in paving construction is first modified for receiving the tracks upon which the machine runs in order that they may be easily removed as desired. It is contemplated to connect these tracks with the railroad siding or crossing adjacent to the point of paving in order that cars filled with bricks may be easily run up to the machine where the bricks are transferred to the machine. The track is not laid directly in the center of the base but near the curb at one side, and at such a distance therefrom that the flanged wheels at the rear will rest squarely upon the curb rails. These curb rails are sectional so that they may be easily removed and placed ahead of the machine, a part of the machine resting upon these rails.

In the operation of the machine the brick car from the railroad line will be coupled to the machine and the bricks will be delivered from this car to my machine. Briefly described, my machine comprises the driving wheels on the track with means for transmitting power thereto, a track lifting device, chutes adapted to be filled by laborers stationed around the ends thereof, a swing chute with means for raising and lowering the same, an inclined table upon which the bricks are placed as they slide from the swing chute, means for placing the bricks in proper rows upon the subgrade, and means for limiting the number of bricks to a row and for breaking joints.

It is also contemplated to provide a structure in a machine of this nature which can be easily transported from place to place when not performing its brick-laying operations.

My invention is also applicable to a machine which is adapted to run directly upon a concrete base or upon planks laid crosswise thereof. In this type of machine, of course, there is no track-lifting device and the bricks are brought up to the machine by motor trucks and the like and dumped directly into a specially constructed feed hopper which will be more fully described hereinafter. In the feed hopper the bricks are raised to a position where they are transferred to the chutes. This machine can be transferred from place to place by taking down certain detachable parts and providing a suitable truck adjacent to the shuttle mechanism end. This type of machine can be moved over the road and steered by its own power.

My invention comprehends also the combination of any or all of the features set forth above, as will be more fully set forth hereinafter and in the claims.

Figure 17:
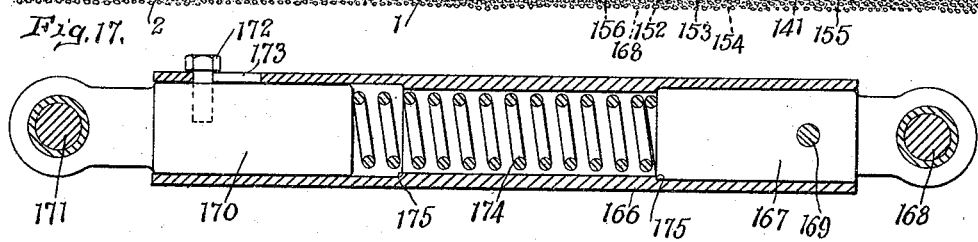
Figure 18:
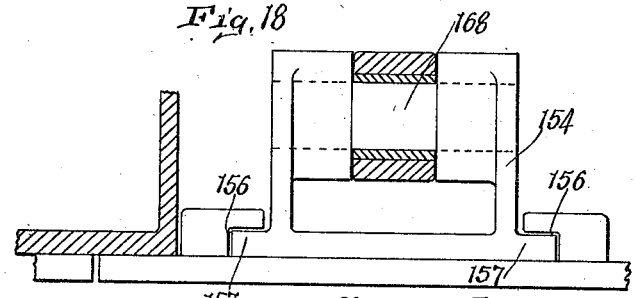

In the accompanying drawings, Figure 1 is a side elevation of one form of my invention; Fig. 2 is a side elevation of the same machine ready for transportation, with parts removed and with an additional truck attached thereto; Fig. 3 is an end elevation of my machine looking toward the left in Fig. 1; Fig. 4 is a plan view of the rear part of my machine showing the swing chute, the brick controlling devices and the shuttle; Fig. 5 is a detail vertical section through the rear portion of my machine on the line 5 5 of Fig. 4, looking in the direction of the arrows, showing the controlling devices and the mechanism of the swing chute; Fig. 6 is an enlarged end view showing the half brick mechanism, the brick controller and the detents for holding the swing chute in elevated position; Fig. 7 is an elevation of the same looking toward the left on Fig. 6; Fig. 8 is an end elevation, partly in section, of the counter or brick controller; Fig. 9 is a detail sectional view on the line 9 9 of Fig. 8; Fig. 10 is a perspective of a track section used in connection with the machine shown in Fig. 1; Fig. 11 is a transverse section through the curb showing a curb rail attached thereto; Fig. 12 is a plan view with parts broken away, showing the half brick mechanism and the detents for controlling the half bricks; Fig. 13 is a detail view of the detent for controlling the admission of half bricks to the completed row; Fig. 14 is a detail view of the detent for controlling the admission of half bricks at the beginning of a row; Fig. 15 is an enlarged detail plan of the mechanism for controlling the swing chute and part of the half brick detents; Fig. 16 is an enlarged detail side elevation of the shuttle or ram mechanism; Fig. 17 is a detail sectional view of the connecting rod for connecting the shuttle with the power; Fig. 18 is a vertical sectional view of a portion of the shuttle stem and the guides therefor; Fig. 19 is a plan with parts broken away of the shuttle mechanism; Fig. 20 is a transverse detached view of the track lifting device; Fig. 21 is an enlarged detail view of the same, as shown in Fig. 1; Fig. 22 is a plan view of my track lifting device; Figs. 23 and 24 are detail views of my automatic clutch mechanism; Fig. 25 is a modified form of my machine which is adapted for use without a track other than the curb rails; Fig. 26 is an elevation of the mechanism for controlling my feed hopper; Fig. 27 is a plan view at the left of the machine shown in Fig. 25 showing the hopper and means for controlling the same and the bucket conveyer; Fig. 28 is a detail sectional view on the line 28—28 of Fig. 26, looking in the direction of the arrow and showing the cam-controlled clutch device; Fig. 29 is a detail plan view of part of the transmission mechanism for the form of my machine shown in Fig. 25; and Fig. 30 is a side elevation of the same.

In the use of my machine it is usual to have the highway in a certain stage of preparation. The concrete base should be laid and the curbs formed. In the use of my machine it is contemplated to provide these curbs with sectional rails upon which part of the machine rests and in some cases a special track will be laid upon the concrete base upon which my machine may operate and upon which the brick used may be brought up on freight cars. In Figs. 3, 11 and 20 is shown a section of road comprising a concrete base 1, curbs 2 and a sand cushion 3. Upon each curb is placed a rail and for this purpose a stringer 4 extends longitudinally of the curb. A rail 5 is placed upon the curb and is secured to the stringer by means of a brace clamp 6 which, with the clamp 7 and through the instrumentality of bolts 8, secures the same to the curb. As shown in Fig. 1 the rails 5 are in section in order that the same may be removed as the machine passes and placed ahead by laborers. By this means the cost of equipment is materially reduced. Where it is intended to use the railroad track the concrete base when fresh is provided with tapered recesses or holes 8', as shown in Figs. 20 and 21. The track 9 is provided in short sections, as shown in Fig. 10. The rails of each section are connected by suitable spacers or tie rods 10 and upon the bottom of each rail are flanged lugs 11 extending transversely of the track and adapted to be inserted within the recesses 8' of the concrete base. These lugs are tapered to correspond to the taper of the recesses and in order that they may be easily removed and fit snugly within the lug holes so that there is very little end or side play. The flanges are attached to the bottom of the rails and one on each rail projects beyond the end thereof. The tracks are assembled, as clearly shown in Fig. 1. The sections when assembled form a track of standard gage which may be connected and joined with any railroad siding that lies adjacent to the road being paved. The brick laying machine can then be fed with bricks which have been hauled from the railroad in cars which run over this track and the machine itself can also be transported to the railroad over these tracks. It is contemplated, as will be more fully described hereinafter, to provide means for automatically lifting the sections and depositing the same to one side as the machine travels along and before the shuttle or brick laying mechanism proper reaches the same. It will be noticed that the track is not laid directly in the center of the base but near the curb on one side so that the curb wheels will rest squarely upon the curb rails.

In Fig. 1 I have illustrated one embodiment of my invention. The machine therein shown comprises a suitable main frame 12, the details of which may be varied, supported by a front truck 13, comprising flanged wheels adapted to run upon the track 9 and power operated to move the machine and rear wheels 14 and 15 arranged to support the rear of the machine upon the curb rails. The various mechanisms are controlled from a single engine, indicated at 16, and the transmission mechanisms will be more fully described hereinafter. At 17 I have shown a conventional railroad car for containing brick coupled to the machine and moving therewith. At the front of the machine at the upper portion thereof is a sprocket 18 rotatably mounted and operated from the engine 16 and upon which is mounted the Weller chain 19. Upon this chain is located a plurality of angle irons 20 adapted to receive the brick. Mounted upon a suitable frame 21 removably mounted within the car 17 is a second sprocket 22 around which the opposite portion of the chain 19 operates. The frame 21 is connected to the main frame 12 adjacent the sprocket 18 by a connecting frame member 23. In the operation of the device as the chain travels, being driven from the source of power, laborers within the car 17 will place the bricks upon the angle irons and the same will be raised to the hopper 24. When one car is empty the support 21 can be removed therefrom and the car can be removed and another car brought up loaded with bricks. It will be seen that by this construction I am able to supply bricks to the machine with a minimum amount of handling. The hopper 24 is provided with rollers 25 which cause the brick to slide easily into position to be fed to the chute 26. This chute is clearly shown in Figs. 1, 3 and 4. It curves outwardly from the hopper 24 and then inwardly spirally substantially as shown in these figures. The chute 26 is divided into a plurality of passages 27 and, in the present instance, there are six of these passages whereby six rows of bricks may be formed at a time. Each passage is provided with rollers 28 to reduce friction and enable the bricks to slide down the same by gravity. The chute is detachably attached at its upper end to the frame, as shown at 29. It is also detachable at its lower end in order that the chute can be removed when the machine is transported. The detachable feature of the lower end of the chute comprises a frame 30 attached at 31, upon which the lower end of the chute rests. The open end 32 of the chute projects below the platform 33 which supports certain of the mechanism. Immediately below this platform and adjacent the end of the chute is a substantial space, indicated at 34 in Fig. 1. As clearly shown in Figs. 3 and 4 the rear of the machine at one side thereof is provided with a laterally extending frame member 35 detachably attached at 36 to the main frame member. Pivoted at 37 by means of a ball and socket at a point remote and below the end of the chute 26 is a pivoted trough 38 which I will term a " swing chute ", this swing chute being adapted to receive the bricks as they are delivered from the chute 26. The swing chute above mentioned extends from side to side of the machine and transversely of the road and is adapted to hold six rows of bricks, the number corresponding with the number of passages upon the main chute. The end of the swing chute adjacent the main chute is open, as indicated at 39, in order that the bricks may slide into the chute when the latter is in a raised position. One side of the chute, indicated at 40, is closed and the end adjacent the pivot is also closed, while the opposite side is open, as indicated at 41, in order that as the swing chute tilts, as will be more fully explained hereinafter, the bricks can slide out upon an inclined table. As clearly shown in Figs. 3 and 5 the chute is provided with a plurality of longitudinally extending pivoted pendant members or slats 42. These members constitute partitions dividing the swing chute into six passages. The swing chute is also provided with a series of rollers 43 for each passage to reduce the friction and allow the bricks to freely gravitate. It is necessary, however, to provide some means for holding the bricks in place while the swing chute is being lowered and for this purpose the member 42 adjacent the opening 41 is provided with a lug 44 adapted to be engaged by a detent 45 which holds the same in position against movement outward. The detent is adapted to be disengaged from the lug 44 when the swing chute is tilted to the position shown in dotted lines in Fig. 5 and for this purpose the frame adjacent thereto is provided with a lug 46 with which the detent 45 engages when the swing chute is tilted, thereby releasing the partition 42. The end of the swing chute is raised and lowered by means of a cable 47 and the operation thereof will be described more fully hereinafter.

In order to retain the end of the swing chute in raised position and in alinement with the main chute I have provided a pair of slidable detents 48, as shown in Figs. 3, 6 and 7. Each detent is provided with an inclined bevel portion at its outer end 49 and a spring 50 which tends to hold the same extended. The swing chute as it is raised will engage the beveled portion and cause the same to be pushed back, but as soon as the swing chute passes the same, the spring 50 will cause the detent to extend beneath the bottom of the chute to hold it in raised position. When it is desired to release the swing chute to lower the same the cable 51 is provided, a pull upon which will retract the detents. With the swing chute in raised position and in alinement with the main chute the rows of bricks will gravitate into the same until it is full. I have provided means for automatically stopping the feed of the bricks when the swing chute is full. In paving construction the bricks are all of uniform size and the width of the road is also known. The number of bricks necessary to span the road can therefore be easily determined and it is essential that only the required number of bricks enter the swing chute. In order to limit the number of bricks that slide into the swing chute I have provided a device which I will term a "counter". Journaled in the frame 30 above the main chute I have provided a shaft 52. Rigidly fixed to this shaft is a drum 53, as clearly shown in Figs. 4, 5, 6, 8 and 9. The drum is provided with a series of longitudinal slots spaced apart circumferentially around the same. Each slot comprises an inner enlarged portion 54 and a reduced portion 55, thereby forming in the drum stops or abutments 56. Slidably mounted in each of the slots is a slat comprising an enlarged portion 57 sliding in the enlarged portion of the slot and a reduced portion 58 sliding in the reduced portion of the slot. These slats project beyond the periphery of the drum and are each provided with a roll 59 to lessen the friction between it and the bricks with which it engages. The slats are freely slidable within their slots and it will be seen that when in their lower position they will hang down beyond the periphery into the path of the bricks, while in their uppermost position they do not project beyond the periphery. I have also provided a modified slot comprising an enlarged portion 60 and a reduced portion 61 providing a shoulder 62 and within this slot is located a slat having a reduced portion 63 sliding within the reduced portion of the slot and an enlarged portion 64 within the enlarged portion of the slot. This last slat at each end thereof is provided upon its inner edge with an inwardly extending pin 65 projecting within a hole 66 and forming a support for a spring 67 which normally tends to keep the last-mentioned slat in raised position.

The chute immediately below my counter is provided with a drop 68 whereby adjacent bricks will be placed out of alinement, as shown in Fig. 6. I have provided a shaft 69 journaled in the upper portion of the frame 30 and above the counter; and this shaft has fixed to it a detent 70 adapted to engage the spring held slat substantially as shown in Fig. 6. The detent may be released from the slat by links 71 operatively connected at one end to the shaft and operatively connected at their opposite ends to suitable mechanism which is controlled by the swing chute when it is raised. This latter mechanism will be more fully described hereinafter.

As is clearly shown in Fig. 6 each of the springless slats are arranged such a distance apart circumferentially and project downwardly when in their lower position sufficiently so that each brick as it drops at 68 will move the slat the fraction of a revolution and sufficiently to bring the next adjacent slat into position to be engaged by the next succeeding brick. It will, therefore, be seen that the number of bricks that pass into the swing chute will correspond and be equal to the number of slats including the spring slat. As shown in Figs. 6 and 8 the spring held slat is in engagement with the detent 70. When this detent is raised the drum will begin to rotate and as the spring held slat approaches the lower position it is enabled to pass the bricks upon the chute by being compressed against the pressure of the spring. It will then be engaged by the end of a brick and will be moved by the same its fractional part of a revolution and will continue to move until it again engages the detent. When the spring held slat is in engagement with its detent it will be seen that one of the lower slats will be in the path of the bricks and prevent the further feeding of the same.

In present paving constructions with brick it is usual to break joint, that is, the joints between the bricks of one row are out of line with the joints of the next succeeding and preceding rows. I have devised means for performing this by machinery. The mechanism that I use to perform this is more or less automatic and independent of the attention of the operator to a great extent. To obtain the necessary results I have provided a device for placing a half brick at the beginning of one row and at the end of the next succeeding row. I will term this mechanism the "half brick mechanism". The details of construction of the mechanism are clearly shown in Figs. 3 to 7 and 12. As shown therein I have provided a bracket 72 fastened to the main frame, as clearly shown in Fig. 3, immediately above the chute 26 and adjacent the end thereof. The bracket is provided with an inclined hopper or chute 73 which is divided transversely into six passages 74 which correspond to the passages in the main chute. Of course, it is to be understood that the number of passages will vary with the variance of the number of passages upon the main chute. I do not desire to be limited to any specific number of rows of paving bricks capable of being handled at one time. At the lower end of each of the passages 74 I have provided a series of openings 75 through which the half brick may drop upon the lower end of the main chute and from there pass into the swing chute. Projecting below each of the openings 75 are a series of detents 76 to 81, as clearly shown in Fig. 12. Beneath the chute 73 I have provided brackets 82 each having at its lower end spaced apart lugs 83 and 84 in which the detents are slidably mounted. The detents are each held in projected position by means of a spring 85 located between the head of the detent and the lugs 83 which serve as abutments therefor. The detents 76, 78 and 80 are adapted to operate in unison at one time and the detents 77, 79 and 81 are adapted to operate in unison at another time. The first-mentioned detents are operated to allow three half bricks to drop and slide into the swing chute at the beginning of the filling operation and the last-mentioned detents are operated to release the half bricks in the remaining three rows at the end of the filling operation. In order to allow this operation the detents 76, 78 and 80 are provided with short stems 86 having downwardly projecting lugs 87 provided with holes 88 and connected together by a single cross shaft 89. The remaining detents are provided with longer stems 90 which project to the rear of the shaft 89 and are provided with upwardly extending lugs at their ends 91. Each of these lugs are also provided with openings 92 and they are all connected by a common cross shaft 93. By a consideration of Fig. 6 it will be seen that one group of detents can operate or be moved rearwardly independently of the other group and without interfering one with the other.

The mechanisms for controlling the groups of detents will now be described. Extending transversely beneath the main chute I have provided a shaft 94 having a squared central portion 95, Fig. 6. A member 96 is provided with a rectangular slot 97 which embraces the squared portion 95 of the shaft 94. The spring 98 which is suitably held in engagement with the member 96 normally tends to cause the same to project into the path of the swing chute. The end of the member 96 adjacent the swing chute is beveled, as shown at 99, and is supported in a suitable slot 100, which prevents the downward movement thereof but allows the upward swinging movement and the rearward sliding movement. The chute in its downward movement engages the beveled portion 99 and forces the member 96 back without influencing any of the other mechanisms. However, as the swing chute is raised it will cause the member 96 to rotate around the axis of the shaft 94, causing the shaft to rotate. The outer ends of the shaft 94 are provided with upwardly extending arms 101 having vertically extending slots 102 which embrace the shaft 89 above mentioned. As the shaft 94 rotates it will be apparent that the arms 101 will swing rearwardly and carry with it three of the detents so that a half brick will be located at the beginning of every alternate row. Simultaneously with the operation of the detents connected to the shaft 89 the detent 70 is also released so that the bricks can begin to slide into the swing chute and for this purpose I have provided a connection between the arm 101 and the links 71 connected to the detent 70. Therefore, the upper end 103 of the arms 101 are connected by links 104 to arms of bell crank levers 105, the levers being fixed to stud shafts 106, the links 71 being attached to the remaining arms of the bell crank levers. To the rear of the shaft 93 is a transversely extending shaft 107, to the ends of which are fixed bell crank levers 108. The upper arms of these bell crank levers are each provided with slots 109 which embrace the shaft 93. Pivoted below the bell crank levers and to the outside of the frame are levers 107' provided with pivoted spring-controlled end portions 108' in engagement with the lower arms of the bell crank levers and adapted to move the bell crank levers when moved in one direction but to bend and pass the same without affecting them when released and returned by the spring 109'. The levers 107' may be operated by means of a cable 110 attached at 111 thereto. By pulling upon the cable 110 the shaft 107 is rotated, thereby withdrawing the three remaining detents so that half bricks will enter the ends of the rows which contain no half bricks. It is contemplated to operate the cable 110 when the whole bricks cease to slide on account of the detent 70 engaging the spring-held slat.

I have provided common controlling mechanism for operating the detents 48 to release the swing chute, for operating the cable 110 to allow the half bricks to slide into the swing chute and for connecting the swing chute to a source of power to lower the same. For this purpose, referring to Figs. 3, 4, 5 and 15, I have provided a pair of standards 112 in which is rotatably journaled a shaft 113 driven by means of a sprocket 114 and a chain 115 connected to the source of power. Upon the shaft is loosely mounted a drum 116 around which the cable 47 is wound and a brake drum 117 controlled by means of a handle 118. Extending upwardly from the standards 112 I have provided a pair of brackets 119 at the upper end of which is journaled a shaft 120 having fixed thereto a pulley 121. The cable 47 after being wound around the drum 116 is passed up around the pulley 121 and a weight 122 is attached to the end thereof, whereby when the bricks are dumped from the swing chute the same will automatically return, as will be more fully explained hereinafter.

I have provided a pair of clutches 123 connected by means of a toggle 124 whereby the drums 116 and 117 may be simultaneously fixed to the shaft upon which they are mounted. The drums will be so fixed when the members of the toggle are in alinement and for operating the toggle I have provided a slidable handle 125 which is guided through a suitable support 126 and attached to the central joint of the toggle. It will be apparent that when the handle 125 is moved in one direction the members of the toggle will be at an angle and the clutches released and when the handle is moved in the opposite direction the clutches will be in. I have attached the ends of the cables 51 and 110 to this operating lever or handle 125. The cable 110 is connected at 127 to the handle 125 in such a manner that when the handle is in such position that the drums are unclutched the cable will be taut. I have attached the cable 51 at 128 to the handle so that in unclutched position the cable will be slack. By the above arrangement it will be apparent that as the handle is moved initially the half brick detent will be momentarily retracted and as the movement is continued the detents that hold the swing chute in elevated position will be retracted and immediately the power will be applied to the cable 47 for lowering the swing chute. Power is used to lower the swing chute in order that all jars and vibrations will be eliminated which are generally present when devices of this nature are lowered by means of their own inherent weight. Pivoted at 130 adjacent the handle 125 and to a suitable part of the frame I have provided a bell crank lever 130' pivotally connected at 131 to the handle or lever 125. The opposite arm of the bell crank lever 132 is arranged in the path of a cam 132' mounted upon the drum 116. The arrangement is such that when the drum 116 has made one revolution the swing chute will be in its lowered position and the cam will engage the arm 132, cause the power to be automatically cut off so that the cable 47 will not be unduly unwound and allow the detents 48 and the levers 107' to return to their normal positions.

Referring to Figs. 5 and 16 I have provided a frame 133 having an upper horizontal portion 134 and an inclined outer portion 135. The length of the horizontal portion 134 is such that when the swing chute is lowered and rests thereupon and the cable 47 has slacked sufficiently the center of gravity of the swing chute will fall to one side of the horizontal portion, causing the same to tilt, as shown in Fig. 5, the swing chute thereby lying against the inclined portion 135 and the brick therein will slide down upon an inclined platform 137 fixed to the frame member 138 constituting the support for the shuttle ram mechanism for shoving each row of brick from the machine onto the highway or roadbed. The frame 138 and the frame 133 are detachable, as shown at 139 and 140, for the purpose of transportation, this part of the mechanism being replaced by a truck which will be described more fully hereinafter. The rows of bricks are adapted to slide down the inclined platform 137 to a horizontal platform 141 located immediately therebelow and extending in front thereof. Pivoted at 142 to a suitable part of the frame is a flanged detent 143 which extends transversely across the machine and normally holds the rows of bricks upon the inclined platform through the instrumentality of a weight 144 which tends normally to hold it in such position. Suitable means are provided for releasing this detent 143 to allow a row of bricks to fall upon the platform 141. This means comprises a cable 145 attached to the detent, extending around pulleys 146, 147 and 148 and attached to an arm 149 at 150 which is fixed to a transverse shaft 151. The shaft 151 is journaled within the frame 138. The inner end of the shaft is provided with a downwardly extending lug 152 extending into the path of a lug 153 fixed to a guide stem 154, which stem constitutes means for guiding and reciprocating the shuttle ram 155, there being a plurality of these stems, as is clearly shown in Fig. 19. As the stems and ram 155 move back the projection or lug 153 engages the projection or lug 152 and trips the detent 143 and allows a row of bricks to fall upon the platform 141. Upon the return of the ram 155 the bricks will be forced off of the platform onto the roadbed. Each of the guide stems are held in suitable guideways 156 fixed to the rear portion of the platform 141, the stems being provided with extending portions 157 which engage these guideways. Journaled in a suitable frame at the rear of the shuttle mechanism is a shaft 158 provided with crank arms 159. The crank arms are connected by connecting rods 160 to the stems 154, whereby the shuttle ram is reciprocated. The shaft 158 is provided with a sprocket 161 and a chain 162 connected to a second sprocket 163 fixed to a shaft 164 journaled in suitable bearings 165. Each of the connecting rods 160 comprises a heavy casing 166 provided at one end with a stud 167 pivoted at 168 to a stem 154. A suitable pin 169 serves to fasten the stud 167 to the casing. The opposite end of the casing is provided with a second stud 170 and a pivot pin 171 adapted to pivotally connect a crank 159. Upon the stud 170 is a screw 172 which projects through a slot 173 and between the two studs is located a coiled spring 174, whereby the stud 171 is slidable relative to the remainder of the connecting rod and the shock and jar due to the operation of the shuttle ram are absorbed. The central portion of the casing 166 in which the central spring 174 is located is reduced in diameter forming abutments 175 adjacent each of the studs to limit the inward movement of the studs.

The several mechanisms described above are operated from the engine 16 mounted in any suitable part of the frame and I have provided a transmission system especially adapted for use in connection with paving machines. The engine is provided with the usual fly wheels 176 and shaft 177 provided with a pinion 178. The speed of the engine is reduced by means of a large gear 179 which meshes with the pinion 178, as more clearly shown in Figs. 1, 3 and 4. The engine is connected to the several mechanisms by means of a cone friction clutch 180 controlled by a suitable lever 181. This clutch is mounted upon a shaft 182 mounted in suitable bearings 183 and is adapted to connect and disconnect the gear 179 to the said shaft. Fixed to the shaft 182 is a gear 184 which meshes with a larger gear 185 fixed to the shaft 164 to which the sprocket 163 above mentioned for transmitting power to the shuttle mechanism is fixed. The shaft 164 has also an additional sprocket 186 thereon for transmitting power to the swing chute control through the sprocket chain 115 to the sprocket 114 above mentioned. The outer end of the shaft 182 is also provided with a gear 187 which meshes with a gear 188 of a Reeves variable speed transmission 189. This speed transmission comprises the well known feed belt (V) which can be regulated to vary the speed of the machine, thereby obtaining any desired spacing. The power is transmitted from the Reeves transmission by means of a pinion 190 to a gear 191 fixed to a shaft 192 journaled in suitable bearings 193. The opposite end of the shaft 192 is provided with a gear 194 meshing with a gear 195 loosely mounted upon the shaft 196. I have also provided a high speed drive through the sprocket 197 mounted upon the same shaft that the gear 188 is mounted on and connected by means of a sprocket chain 198 to a sprocket 199 loosely mounted upon the shaft 196. I have provided a suitable clutch 200 whereby either the gear 195 or the sprocket 199 may be clutched to the shaft 196, the clutch being provided with a suitable handle 201. This clutch can be used for traction or to control the travel of the machine, that is, the power to the trucks can be disconnected or connected at this point and the speed with which the trucks are driven can be regulated or varied by adjustment of the Reeves transmission, or by swinging the clutch into the sprocket 199. The shaft 196 is provided with a bevel gear 202 which meshes with a bevel 203 fixed to a shaft 204 extending at right angles to the shaft 196. This shaft extends adjacent the truck 13 above mentioned and is journaled in suitable bearings at 205. A pair of bevel gears 206 and 207 are slidably mounted upon this shaft and either gear is adapted to engage a bevel gear 208 or the bevel gears 206 and 207 may be disconnected from this bevel gear 208. The bevel gear 208 is fixed to a vertically extending shaft 209 and the shaft is provided at its lower end with a gear 210 which meshes with a gear 211 and the gear 211 in turn meshes with a gear 212 fixed to the axle of one of the truck wheels. In order to reverse the direction of rotation of the wheels or to disconnect the wheels from the source of power I have provided a sleeve 213 adapted to move the gears as desired. This sleeve 213 is controlled by means of a lever 214 pivoted at 215 and connected to the sleeve. This lever is controlled by a longitudinally extending link 216 pivoted at 217 to the lower end of a lever 218 pivoted centrally at 219. The lever 218 is held in adjusted position by means of a suitable detent 220 which is adapted to engage the toothed quadrant upon which the lever is pivoted. Loosely mounted upon the shaft 196 is a sprocket 221 controlled by a clutch 222 to connect it to and disconnect it from the shaft upon which it is mounted, and I have provided a chain 223 for connecting this sprocket to the sprocket 18 for driving the brick conveyer, which has already been described.

By the above arrangement of transmission mechanism it will be seen that the conveyer for loading the bricks upon my machine is controlled by power from a single engine, the truck is also independently operated by means of this engine, the shuttle mechanism is also operated, and likewise the mechanism for lowering the swing chute. In this particular embodiment of my invention I have also devised a track lifting device which is operated by means of power derived from the engine through the transmission system just described. My track lifting device is clearly shown in Figs. 1 and 20 to 24, inclusive. I have located the track lifting device below the main frame of the machine to the rear of the front truck and in front of the shuttle mechanism. I have provided suitable frame members 224 for supporting the device. Journaled within the frame members is a shaft 225 provided at one end with a gear 226 meshing with the gear 195 of the transmission system. The shaft 225 is provided with a sprocket 227 and is connected through a sprocket chain 228 with a second sprocket 229 fixed to the shaft 230 which is rotatably journaled in pendant supporting members 231. This shaft is located centrally above the track and is provided with a pair of gears 232. These gears are located above and between the track sections 9. Pivoted to the lower portion of the pendant supporting member 231 at 233 is a sleeve 234, there being a sleeve in alinement with each of the gears 232. A spring 235 fastened at one end to the member 231 and at its other end to the sleeve 234 at its upper end and above its pivotal point tends to draw the sleeve backward away from the gear. Slidably mounted within each sleeve is a vertical member 236 provided on its side adjacent the gear with a rack 237. The lower end of each member is pivotally connected to a shaft 238 which, in turn, is journaled in suitable bearings on a rectangular frame 239. Fixed to the shaft 238 are a pair of hooks 240 provided with integral arms 240' and adapted to engage the front spacer 10, as shown in Fig. 21. Fixed to the shaft 238 is a crank arm 241 which is connected by a spring 242 to the frame 239. The spring is of sufficient strength to hold the hooks in engagement with the spacer as the machine advances and prevents the hooks from slipping past the spacers. Journaled at the rear of the frame 239 is a second shaft 243 provided with hooks 243' fixed thereto and adapted to engage the rear spacer of the track section. Arms 244 are provided on each shaft and are connected by a rod 244' whereby both shafts rotate in unison. A cable 245 is connected at 245' to the upper end of each member 236, is passed around a pulley 246 and rearwardly around a pulley 246' where it extends downwardly and is secured to the shaft 243. A pair of tracks 247 extend outwardly and downwardly from the track lifting device. These tracks are supported by suitable hangers 247' and I have provided a carriage 248 adapted to travel upon the same. This carriage is provided with vertically extending members 249 and 250, which members are provided at their upper extremities with trolleys 251 adapted to run upon the tracks. Mounted upon the carriage is a pair of parallel angle irons 252 for supporting the sections of track when lifted. I have also provided a power controlled drum 253 and a cable 254 attached at its ends to the carriage and having its central portion wound about the drum so that when power is applied to the drum the carriage will be moved up the inclined track to the track-lifting devices, the carriage returning to the lower portion of the track under the influence of gravity. Assuming that the machine is traveling toward the left in Fig. 21 the hooks 240 and 243' will engage the transverse spacing members 10 of each track section. The movement of the hooks will thereby be retarded and this will cause the upper portion of the members 236 to swing forward, causing their racks to mesh with the gears 232. As the gears are continuously rotating the members 236 with their racks will move upwardly carrying the section of track with it, the weight of the track serving to continue the engagement of the gears and racks until the track has been sufficiently lifted. As the members 236 rise a pull will also be exerted upon the cables 245 and both ends of the track will be uniformly raised. When the section of track has been raised sufficiently I have provided means for automatically throwing in the power to cause the drum to rotate to bring the carriage up to receive the track section. For this purpose I have provided a cone clutch 255 in connection with the drum, this cone clutch being controlled by means of a toggle 256 which is fastened at one end to a fixed part of the frame and at the other end to the clutch member. Adjacent the central pivot of the toggle at 257 is attached one end of a cable 258 which is suitably guided, as at 259, with its opposite end attached to the upper portion 260 of one of the members 236. It will be seen that as the member 236 is elevated it will exert a pull upon the cable 258, thereby extending the toggle and forcing the clutch into engagement with the drum and thereby causing the drum to rotate with the shaft upon which it is loosely mounted. As the drum rotates the carriage 248 will be brought up to receive the section of track.

I have provided knee rockers 261 for the purpose of causing the section of track when the carriage is in its lowest position to be removed from the carriage as it returns to the upper position. The rockers are journaled in suitable frame members adjacent the lower end of the track and are so arranged that the carriage can pass the same when it is moving downwardly, as clearly shown in solid lines in Fig. 20. But when the carriage is returned the rocker will be in the path of the section of track thereupon and will allow the carriage to return but will hold the section so that it will be removed from the carriage and dropped to one side. As the carriage approaches the uppermost position a cam 262 with which it is provided engages the arm 240' of a hook 240 rocking the shafts 238 and 243 about their axes against the tension of the spring 242 and releases the track section. The section will then rest upon the carriage. At the same time a cam member 263 upon the carriage will move into engagement with a lever 264 which is pivoted at 265 and provided with a portion 266 extending over the central pivot of the toggle. As the carriage moves upwardly the cam 263 will engage the upper side of the projecting portion of the lever 264, as indicated at 267, and bend the toggle downward, thereby releasing the clutch and disconnecting the power. When this occurs the carriage will return to the lower portion of the track under the influence of gravity and the weight of the track section having been removed from the members 236 the springs 235 will draw them out of engagement with their gears and they will lower to receive and engage the next track section.

I have also provided my machine with a water tank 268, as shown in Fig. 1. The tank is provided with a conduit 269 which connects it with a sprinkler 270 located to the rear of the track lifting device. Immediately to the rear of the sprinkler and the track lifting device and in front of the shuttle is located a sand cutter 271 for the purpose of cutting the sand to the required depth. To the rear of the sand cutter is a roller 272, the cutter and roller being mounted upon a frame which is attached to the main frame, as indicated at 273.

It is thought that in connection with the above extensive description the operation of the type of machine above described will be clear. The use of the standard gage track in connection with my machine involves a great saving of labor and time because the machine and the material can be easily brought up and easily handled thereby.

Fig. 1 shows the machine in position for operation. The car full of bricks has been brought up upon the track and attached to the machine. When the work of paving is to commence the operator who is stationed about the engine throws in the main power clutch 180. After that the power to the driving wheels on the truck is thrown in and the machine starts to move slowly at the rate at which the machine will lay the rows of bricks. As the front truck moves over a section of track the track lifter will then start to raise the section and the conveyer from the car to the machine is put in motion. As the bricks are raised by the conveyer into the hopper 24 laborers will fill the chutes with bricks and the same will slide to a lower position. The swing chute is raised and these bricks will slide into the swing chute until the same is filled. Then the bricks will be automatically shut off. I have also provided means for supplying half bricks at the beginning of three rows and half bricks at the end of three rows, the rows being alternate. This arrangement insures that the rows when laid will break joints. When the swing chute is filled the operator throws in the clutch for the swing chute lowering drum and the chute then swings down to its horizontal position and rotates sufficiently to slide the rows of bricks off of the swing chute onto the inclined table. From the inclined table they are pushed off one row at a time onto the pavement by the shuttle or ram which the operator has previously started working. At each reciprocation of the shuttle a row of bricks is allowed to fall upon the horizontal platform below the inclined platform and as the shuttle moves forward again the row is pushed off. Before the inclined table is entirely empty the swing chute will have again raised to its upper position on account of the counterweight to which it is attached and the bricks are again automatically started, beginning with a half brick in each alternate row. It will be noticed that as the swing chute raises it automatically causes half bricks to enter the beginning of three alternate rows and at the same time it automatically causes the whole bricks to start to slide into it again. When the swing chute is filled, however, it is necessary for the operator to release the remaining half brick detents and the detents which support the swing chute in raised position and also to throw in the clutch for lowering the swing chute. These operations, however, are performed by a single movement of a lever, as was more fully described above. As the machine travels the sand cushion is being cut to the proper contour and then rolled. The curb rails over which the machine has moved are lifted and carried to an advance position immediately ahead of the machine by two laborers who then place them preparatory to the advancement of the machine over them. When one car has been emptied of bricks another can be brought up and attached and the operations will continue as before.

It will be seen that I have provided a machine in which all the parts work in harmony and synchronize. I have provided a common source of power for working the several mechanisms. When it is desired to transport the machine the swing chute is first detached, then the shuttle end of the machine is detached, the feed chutes are also detached and the tracks upon which the carriage for the track lifter moves, as well as the cutter and roller are likewise detached. All these parts are carried along with the machine. By referring to Fig. 2 it will be seen that I have provided a truck 274 which is mounted upon a frame 275 which replaces the shuttle mechanism and the parts of the machine adjacent thereto. I have also provided couplers 276 at the front and rear. Fig. 2 shows substantially the way the machine will look when it is ready for transportation. All projecting portions and portions that lie too close to the ground have been removed and a rear truck has been placed thereon. The machine can be driven along by its own power through the driving trucks on standard tracks from place to place or it can be hauled by a suitable engine coupled thereto.

Conditions may arise in which it will be impracticable to provide tracks for my machine, as set out above. The section of road to be paved may be too far from a railway or the section to be paved may be too small to warrant the expense of the larger machine which is adapted to operate on my rails. Therefore, I have shown in Fig. 25 a slightly modified form of machine which will be smaller in size than the one above described for the reason that the track lifting devices have been eliminated therefrom and the wheels at the front will be flat instead of flanged. These wheels can either rest directly upon the concrete base or upon planks. I have, however, retained the guide wheels which are guided on curb rails, as in the machine first described. These guide wheels serve to keep the machine in correct alinement with the center of the concrete base. As the machine works along laying bricks the curb rails are removed and placed in advance position in the same way that was done in the case of the machine that operates upon a track. In this form of machine it will be impossible, of course, to bring the bricks up on a freight car, but they will have to be brought up in wagons or trucks or industrial railway cars and dumped into the feed hopper which I have devised and which will be described more in detail hereinafter.

The feed hopper is raised by mechanical power and I have provided a bucket conveyer which lifts the bricks from the feed hopper to a storage hopper where they are dumped. In other respects this second type of machine is the same as the machine first described. The machine is self propelled and when it is to be moved to new work certain parts are detachable, as in the other type of machine and the guide wheels and shuttle end of the machine are replaced by a frame provided with a wheeled truck suitable for traveling over the road without rails.

Referring to Figs. 25 to 30 I have therein shown a machine provided with a suitable frame 280, a front truck 281 adapted to travel upon the road itself, rear guide wheels 282 and 283 arranged to be guided and to travel upon the curb rails 284. I have also located upon the machine an engine 285 for operating the several operable mechanisms. The engine is provided with a suitable gear 286 which meshes with a gear 287 fixed to a shaft 289 upon which is also fixed a gear 288, this latter gear meshing with a gear 290 mounted on a shaft 291 which is operatively connected through a sprocket chain 292 with the drum 293 for raising and lowering the swing chute. The shaft 291 is also provided with a sprocket chain 294 operatively connected to the shuttle mechanism 295. I have also provided counting mechanism 296 and half brick mechanism 297. These features are all the same as in the case of the machine first described and it is thought it is not necessary to go more into detail, as the structure was fully described above.

Mounted upon the shaft 289 is a gear 298 which meshes with a gear 299 of a Reeves transmission box 300, (see Fig. 29 and the description thereof), the construction of which is well known and was mentioned above in connection with the other form of my machine. The box 300 is provided with a pinion 301 which meshes with a gear 302 mounted upon the shaft 303. This shaft is also provided with a smaller gear 304 meshing with a gear 305 loosely mounted upon a shaft 306. I have also provided a sprocket 307 mounted upon the axis and adjacent to the gear 299 and connected by means of a sprocket chain 308 to a sprocket wheel 309 loosely mounted upon the shaft 306. This latter transmission provides a high speed drive for the truck mechanism. I have provided a lever 310 operatively connected to a clutch 310′ whereby the power to the truck can be transmitted at varying speeds either through the Reeves transmission or through the high speed drive. Fixed to the shaft 306 is a bevel gear 311. This gear meshes with a gear 312 fixed to the end of a shaft 313 extending at right angles to the shaft 306 and mounted in suitable bearings 314. The truck 281 is operatively connected with this shaft for driving the machine and also for steering the same and for this purpose the truck is provided with a gear 315 operatively connected to the longitudinally extending shaft 313 through a vertically extending shaft 316 provided at its upper end with a bevel gear 317. The shaft 313 adjacent the gear 317 is provided with a sleeve 318 adapted to be moved axially, but to rotate with said shaft. The sleeve is provided at each end thereof with a gear 319 and 320, either gear of which is adapted to be moved into mesh with the gear 317, or both can be moved out of mesh. A lever 321 is operatively connected at 322 to the sleeve 318. This lever is pivoted intermediate its ends at 324 and its upper end is connected at 325 to a longitudinally extending link 326 connected to an operating lever 327 which is locked by means of the locking device 328. The truck is swiveled to rotate around a vertical axis, as indicated at 329, and is provided with a gear segment 330. A vertical shaft 331 is provided which has a gear 332 fixed thereto at its lower end and in mesh with the gear segment 330. When the gear 332 is rotated, of course the truck will be moved either one way or the other for steering. The upper end of the shaft 331 is provided with a bevel 333 adapted to mesh with the bevels 334 and 335 fixed to a sleeve 336 mounted upon the shaft 313 movable axially thereof, but rotatable therewith. When it is desired to steer the machine to the left or right either one gear or the other is moved into mesh with the gear 333 and for doing this I have provided the sleeve 336 with a vertically extending portion 337 to which is attached at 338 a lever 339 pivoted intermediate its ends at 340. The upper end of the lever is connected at 341 to a longitudinally extending link 342 connected at its other end to an operating lever 343 which is held in locked position by means of a locking device 344 of well known construction. The vertical shaft 331 is also provided with a circular ratchet 345 with which is adapted to engage a three toothed pawl 346 which is normally held in engagement with the ratchet by a spring 347 which is located between suitable abutments 348. I have provided a pair of pulleys 349 around which is guided a cable 350 attached to the pawl at 351 at one end and at its other end is attached to the lower end 352 of a lever 353 pivoted intermediate its ends to a part of the frame 354 and is connected at its upper end 355 to the link 342. When the link 342 is moved either one way or the other from the position shown in the drawings, the pawl will be released from the ratchet 345. Loosely mounted upon the shaft 306 adjacent one end thereof is a sprocket 356 controlled by a clutch 357 and connected by means of a sprocket chain 358 to a sprocket 359 fixed to the shaft 360, which shaft is journaled in suitable bearings 361. The shaft 360 is provided with a pair of drums around which endless bucket conveyers 363 are placed, the shaft 360 being controlled by a suitable pawl and ratchet 364 and 365. The conveyer is adapted to raise bricks from a lower level to a higher level into the hopper 366 from which they are directed into a chute 367 by the laborers, as in the form of machine described above. The lower bends of the endless bucket conveyer embrace drums 368 rotatably mounted upon a shaft 369 journaled in bearings 370 located at the lower part of the machine and adjacent the front thereof, that is, the end remote from the shuttle mechanism.

I have provided a feed hopper or platform 371. This feed hopper is pivoted to the shaft 369 and is provided with converging scoop portions 372 which direct the bricks adjacent each of the bucket conveyers, whereby when the feed hopper is raised the bricks will slide down and be lifted one by one by the bucket conveyer. When it is desired to load bricks onto the platform 371 it is lowered and the bricks are dumped thereon. Before the bricks can be raised, however, to the hopper 366 it is necessary to elevate the outer end of the feed hopper or platform around its axis 369. This is done by power and for the purpose the shaft 360 is provided with a sprocket wheel 373 which is connected by means of a sprocket chain 374 with a sprocket 375 loosely mounted upon a shaft 376 suitably journaled at 377 at the upper rear portion of the machine. The extremities of this shaft 376 are provided with drums 378 around which are wound cables 379 attached at their ends 380 to the platform 371. I have also provided a drum 381 fixed to the shaft 376 around which a cable 382 is wound, passed around a pulley 383 and provided at its lower end with a counterweight 384 to counterbalance the feed hopper 371. I have provided a clutch 385 for clutching the sprocket 375 to the shaft 376. For operating the clutch I have provided a toggle 386 connected at one end 387 to the clutch and at the other end to a fixed part of the frame 388 and I have provided means for raising and lowering the intermediate axis 389 of the toggle. For raising the toggle I have provided a slide 390 suitably guided and provided with a bevel portion 391 adapted to engage the central portion of the toggle to raise the same when it is moved toward the right, as shown in Fig. 28. I have provided a cable 392 which passes around a suitable guide pulley 393 with which to operate the slide. When the slide 391 is in the position shown in Fig. 28 the clutch has engaged the sprocket and caused the same to rotate to lift the feed hopper. It is essential that the power be cut off when the hopper is raised sufficiently and for this purpose I have provided an automatic device for doing it and this device consists of a wheel 394 fixed to the shaft 376 and provided with a cam portion 395 so that as the wheel rotates the cam at the end of a complete revolution will engage the upper portion of the toggle and lower the same, thereby disengaging the clutch. I have also provided a ratchet wheel 396 fixed to the shaft, and a pawl 397 which is spring-controlled, as shown at 398, and manually operable through a cable 399 which is guided around a pulley 400. When the hopper is in raised position it will be seen that it can be securely locked to prevent the falling thereof. When it is desired to fill the hopper again the pawl is released and the hopper will descend under its own weight, the counterweight preventing a too rapid descent. My machine is also provided with the cutter 401 and the roller 402 which are the same as the cutter and roller described in connection with my first form.

It is thought the operation of my second form of machine will be obvious from what has been described above, the operation thereof, with the exception of the means for raising the bricks to the hopper 366, being substantially the same. I have provided power operated means for steering the front trucks in addition and in this latter form the track lifting devices have been omitted. It is thought that it will be seen that the operation and structure is the same in other respects.

It will be seen that the travel of my machine can be delicately adjusted to synchronize with the movements of the shuttle ram. This adjustment is possible on account of the variable speed transmission shown more fully in Fig. 29. The disks 403 there shown are operated by shifting levers 404 in such a manner that as one pair is separated the others are brought closer together, causing the V-belt 405 to run over a smaller diameter of one pair and a larger diameter of the other, thus increasing or decreasing the speed. The levers are operated by a hand-controlled shifting screw 406 comprising right and left hand screw portions in mesh with the levers so that the levers always move in opposite directions to move the disks accordingly. The term "brick" or "bricks" as used in the specification is defined as including any suitable paving material in block form.

While I have shown two forms of my invention it is to be understood that I do not desire to be limited to any of the forms set forth and described. The several features may be used separately or together and the mechanisms are capable of wide variation.

Having thus fully described my invention, what I claim as new and desire to secure by Letters Patent, is:—

1. In a paving machine, propelling mechanism, a device in which the row of brick is formed, means for delivering brick to said device, means operable independently of said propelling mechanism for transferring the row of brick to the roadbed, and means for transferring the row from said device to said means.

2. In a paving machine, a chute, stop devices arranged in reference thereto to periodically arrest and release the bricks in their course to the roadbed, and means for transferring the succeeding bricks into place with respect to the bricks already laid.

3. In a paving machine, means for delivering a row of brick to the roadbed, a device in which the row is formed, means for feeding brick to said device, and means effecting the feed of brick to said device so that they will break joints.

4. In a paving machine, means for delivering brick in rows to the roadbed, a half-brick chute, and means for periodically admitting half-brick therefrom to the rows, whereby they break joints.

5. In a paving machine, a device in which the rows of bricks are formed, an inclined storage platform, means for transferring the rows of bricks from said device to said storage platform, and means for transferring the rows of bricks from said storage platform to the roadbed.

6. In a brick paving machine, a device in which the rows are formed, means for automatically limiting the number of bricks to a row, and means for feeding half bricks to the row.

7. In a brick paving machine, a device in which rows of bricks are formed, means for retaining the rows in said device, means for tilting said device and releasing said retaining means, a storage platform to receive the rows of bricks when said device is tilted, a detent to retain the rows of bricks upon said platform until needed, and means for transferring the rows from said platform to the roadbed and operating said detent.

8. In a brick paving machine, a chute in which the rows of bricks are formed, means for moving said chute to such position as to receive the bricks during the row-forming operation, means for moving said chute to empty the rows therefrom, and means transferring said rows to the roadbed.

9. In a brick paving machine, a storage platform, shuttle mechanism below said platform for transferring the rows of bricks to the roadbed, a detent for retaining said rows upon said platform, and means operated by said shuttle mechanism for actuating said detent.

10. In a brick paving machine, power operated propelling mechanism, devices for forming rows of bricks, a shuttle platform adapted to receive the rows of bricks, a ram slidably mounted upon said platform, guides upon said platform for retaining said slidable ram in position, and power-operated means for actuating said ram.

11. In a brick paving machine, power operated propelling mechanism, devices for forming rows of bricks, a shuttle mechanism comprising a slidable ram, power-operated means for actuating said ram, and resilient devices interposed in said last-mentioned means for absorbing shock when said ram is actuated.

12. In a brick paving machine, a shuttle mechanism, and means for operating said shuttle mechanism comprising a tubular link connected with a source of power and having relatively movable parts, and a spring interposed between said parts.

13. In a brick paving machine, an inclined storage platform, a pivoted detent extending longitudinally in front of said platform for retaining the rows of bricks thereon, shuttle mechanism located beneath said platform and provided with an abutment, and means controlled by said abutment for operating said detent.

14. In a brick paving machine, a cutter for cutting the roadbed, a roller to the rear of said cutter for rolling the roadbed, and brick laying mechanism to the rear of said roller for transferring the brick to said roadbed.

15. In a brick paving machine, a universally pivoted swing chute, a fixed chute, means for raising said swing chute into alinement with said fixed chute in order to allow the former to fill with bricks forming rows, and means for tilting said swing chute to empty the same of its rows.

16. In a brick paving machine, a universally pivoted swing chute, a fixed inclined chute, means for raising said swing chute into alinement with said fixed chute to receive the rows of bricks, detents for retaining said rows in position on said swing chute, and means for tilting said swing chute to release said detents and empty the rows of bricks.

17. In a brick paving machine, a movable chute adapted to receive bricks to form rows, detents to retain said rows in place upon said chute, means for moving said chute to empty the rows of bricks therefrom, and means on a fixed portion of the frame work for engaging said detents to release the same when the chute is moved.

18. A brick paving machine comprising a hopper to receive bricks, means for hoisting the bricks to said hopper, a chute, a storage platform, means for transferring rows of bricks from said chute to said storage platform, and shuttle mechanism for transferring the bricks to the roadbed.

19. In a brick paving machine, a chute, for forming a row of brick, means for automatically limiting the number of bricks to a row, means for transferring the row from said chute into a position to be moved upon the roadbed, and means for so moving said row.

20. In a brick paving machine, a chute adapted to receive the bricks to form rows, means for limiting the number of bricks to a row, and means for causing successive rows to break joints.

21. In a brick paving machine, a chute adapted to receive bricks to form rows, and means for admitting half bricks to certain of said rows at the beginning of said row-forming operation and to admit half bricks to certain of said rows at the end of the row-forming operation.

22. In a brick paving machine, a chute adapted to receive bricks to form rows, means for emptying said chute of the rows when formed, means for automatically feeding half bricks at the beginning of certain of said rows, and means for feeding half bricks to other of said rows at the end thereof and emptying said chute of said rows.

23. In a brick paving machine, a swing chute adapted to receive rows of bricks, means for retaining said swing chute in position to receive said bricks, and means for feeding half bricks at the beginning of certain of said rows and at the end of other of said rows, means for releasing and moving said swing chute to empty the rows of bricks, part of said half brick-feeding means being operated when said chute is released and moved and another part of said half brick-feeding means being operated when said chute is returned to normal position.

24. In a brick paving machine, a chute adapted to receive rows of bricks, a half-brick hopper located adjacent to said chute and opening into the same, detents for retaining said half bricks in said half-brick hopper, means for retracting certain of said detents at the beginning of the row-forming operation, and means for retracting other of said detents at the end of the row-forming operation to feed the half bricks.

25. In a brick paving machine, a half brick mechanism comprising detents, automatic means for operating certain of said detents to feed the half bricks to certain of the rows to be formed, and means for operating other of said detents to feed the half bricks to the opposite ends of other of said rows.

26. In a brick paving machine, means for automatically limiting the number of whole bricks to a row comprising a chute with an offset portion, a drum rotatably mounted above said offset portion, said drum comprising a plurality of freely movable slats therein, one of said slats being held projected, and a detent to engage said slat to prevent the further operation of the drum.

27. In a brick paving machine, a chute adapted to receive bricks to form rows, means for emptying said chute, means for automatically limiting the number of bricks to a row, means for admitting half bricks at the beginning of certain of said rows and at the end of other of said rows, and means for simultaneously operating part of said half-brick mechanism and releasing said automatic brick limiting means to allow the rows of bricks to be again formed after the chute is emptied.

28. In a brick paving machine, a swing chute adapted to receive bricks to form rows, means for admitting half bricks at the beginning of certain of said rows and at the end of other of said rows, means for automatically stopping the feed of bricks to said rows, means for moving said swing chute to empty the rows when formed, and means operated by said swing chute when it is returned to normal position to admit half bricks at the beginning of certain rows and to resume the feeding of the bricks to form rows.

29. In a brick paving machine, a fixed chute, a swing chute adapted to be moved into alinement with said fixed chute and to receive bricks to form rows, power operated means for moving said swing chute when filled to empty the same, and automatic means for moving the same into alinement with said fixed chute.

30. In a brick paving machine, a fixed chute, a swing chute, power operated means for moving said swing chute when filled to empty the same, automatic means for returning the chute into position to be filled, means for retaining the swing chute in the latter position, and manually controlled means for simultaneously releasing said retaining means and throwing in the power to lower the swing chute when filled.

31. In a brick paving machine, a fixed chute, a swing chute, power operating means for said swing chute to move the same into position to empty the rows of bricks, and means for automatically shutting off the power when the swing chute has been moved to such position.

32. In a brick paving machine, a movable chute adapted to be moved into position to receive bricks to form rows and to be moved to empty the said rows, and means for controlling the movement of said chute comprising a power shaft, a brake drum and a cable drum loosely mounted on said power shaft, a cable connected at one end to said movable chute and wound about the cable drum and provided at its other end with a counterweight suitably guided, means for simultaneously clutching said drums to said power shaft to move the swing chute to empty the same, means for automatically disconnecting said drums from the power shaft when the chute has been so moved, said counterweight returning the chute to normal position.

33. In a brick paving machine adapted to run upon sectional tracks, brick laying mechanism located at the rear thereof, track lifting devices mounted on said brick paving machine in front of said brick laying mechanism, and power operated means for operating said brick laying mechanism and said track lifting devices.

34. In a brick paving machine adapted to run upon sectional tracks, brick laying mechanism located at the rear thereof, track lifting devices mounted in front of said brick laying mechanism, and devices for preparing the roadbed for paving located between said track lifting devices and said brick laying mechanism.

35. In a track lifting device, means to engage the track, means for lifting said track, a carriage, means for bringing said carriage beneath said track, means for releasing said track upon the carriage, and means for moving said carriage to place the track to one side.

36. In an automatic track lifting device, means adapted to engage a section of track, means for automatically raising said first-mentioned means when the track is so engaged, a carriage, means for automatically moving said carriage beneath said track lifting means and automatically releasing the track section upon the carriage, means for automatically moving the carriage with the track section to one side of the machine, and means for automatically ejecting the track section from said carriage.

37. In a track lifting mechanism, means for engaging the track section, power operated means for raising said first-mentioned means to raise the track section, means controlled by the raising of said first-mentioned means for moving a carriage beneath said track section, means on said carriage for automatically releasing said track section thereupon, and means for returning said carriage to one side of the machine to allow the track section to be removed therefrom.

38. In a brick paving machine, sectional tracks mounted upon the roadbed, sectional tracks mounted upon the curb, a machine provided with brick laying mechanism, a power driven truck upon said first-mentioned tracks, and guide wheels mounted upon the last-mentioned tracks.

39. In a track section adapted for use in connection with paving operations, a pair of rails spaced apart and connected by a tie rod, said rails being provided with downwardly extending flanges adapted to be inserted in holes in a cement base to retain the same in position.

40. In a track section adapted for use in connection with paving operations, a pair of rails spaced apart and connected by tie rods, lugs having flanges attached to the opposite ends of each of said rails and extending downwardly and adapted to engage openings in a cement base, certain of said flanges extending beyond the ends of the rails.

41. In a curb rail adapted to receive certain of the supporting wheels of a brick laying machine, a rail, clamping plates fixed to said rail and embracing the curb, and a stringer attached to one of said clamping plates.

42. In a brick paving machine, a main frame, a power driven truck mounted on said main frame, brick paving mechanism, a source of power, clutches connecting and disconnecting said brick paving mechanism to the source of power, speed adjusting devices for adjusting the speed of said truck, and clutch and reversing devices for said truck.

43. In a brick paving machine, a main frame, brick laying mechanism associated therewith, a supporting truck, transmission devices connecting said supporting truck to a source of power for driving the same, hoisting devices for hoisting brick, said hoisting devices and said brick laying mechanism being also connected to a source of power, and clutches for connecting the several operating parts of the machine and disconnecting the same to the source of power.

44. In a brick paving machine, a main frame, a power driven truck supporting one end of said frame, brick laying devices mounted at the other end of said frame, said brick laying devices being detachable, and a frame provided with a second truck adapted to replace said detachable brick laying devices.

45. In a brick paving machine, a hopper located at the upper portion thereof, an adjustable hopper located at the lower portion thereof, power operated means for raising said last-mentioned hopper, means for automatically shutting off the power when said last-mentioned hopper is raised, and a conveyer for conveying the bricks from the last-mentioned hopper to the first-mentioned hopper.

In testimony whereof I affix my signature.

JOHN FREDERICK SEIBERLING.

Copies of this patent may be obtained for five cents each, by addressing the "Commissioner of Patents, Washington, D. C."